United States Patent
Friedrichs et al.

(10) Patent No.: US 10,197,221 B1
(45) Date of Patent: Feb. 5, 2019

(54) AIR ACTUATED VALVES SWITCH AND SOFTWARE CONTROL SYSTEM FOR USE WITH CRYOGENIC LIQUID SYSTEMS

(71) Applicant: Controls Corporation of America, Virginia Beach, VA (US)

(72) Inventors: John Friedrichs, Virginia Beach, VA (US); Lawrence Gallagher, Virginia Beach, VA (US); Christopher Gamboni, Virginia Beach, VA (US); Georg Dukas, Virginia Beach, VA (US); Richard Cusimano, Virginia Beach, VA (US)

(73) Assignee: Controls Corporation of America, Virginia Beach, VA (US)

( * ) Notice: Subject to any disclaimer, the term of this patent is extended or adjusted under 35 U.S.C. 154(b) by 735 days.

(21) Appl. No.: 14/582,762

(22) Filed: Dec. 24, 2014

Related U.S. Application Data

(60) Provisional application No. 61/921,314, filed on Dec. 27, 2013.

(51) Int. Cl.
   *F17C 13/04* (2006.01)
   *F17C 13/02* (2006.01)

(52) U.S. Cl.
   CPC ............ *F17C 13/04* (2013.01); *F17C 13/025* (2013.01); *F17C 13/026* (2013.01);
   (Continued)

(58) Field of Classification Search
   CPC ...... F17C 13/04; F17C 13/025; F17C 13/026; F17C 13/045; F17C 2205/0323;
   (Continued)

(56) References Cited

U.S. PATENT DOCUMENTS 4,869,301 A * 9/1989 Ohmi ................ H01L 21/67069
                                                        134/169 R
6,070,413 A * 6/2000 Ward ........................ F17C 7/00
                                                        138/114

(Continued)

*Primary Examiner* — Frantz Jules
*Assistant Examiner* — Webeshet Mengesha
(74) *Attorney, Agent, or Firm* — Miles & Stockbridge, P.C.; David R. Schaffer

(57) ABSTRACT

A cryogenic liquid switching system including an electronic control mechanism; a solenoid valve communicatively connected to the electronic control mechanism via an interface cable; a gas input control connected to the solenoid valve; and a pair of pneumatic valve actuators connected to the gas input control via separate isolation tubing components The system also including a pair of valve actuator pins, one each connected to a respective one of the pair of pneumatic valve actuators; a pair of pneumatic valves, one each connected to a respective one of the pair of valve actuator pins; and a cryogenic liquid input in fluid communication with at least a portion of each of the pair of pneumatic valves. The system further including a first cryogenic liquid output in fluid communication with a first of the pair of pneumatic valves; a second cryogenic liquid output in fluid communication with a second of the pair of pneumatic valves; and a temperature probe positioned adjacent to an exit of the cryogenic liquid input to measure the temperature of an incoming cryogenic liquid and send a signal to the electronic control mechanism to open and close the pneumatic valves based at least in part on the temperature of the incoming cryogenic liquid.

13 Claims, 15 Drawing Sheets

(52) U.S. Cl.
CPC .... *F17C 13/045* (2013.01); *F17C 2205/0323* (2013.01); *F17C 2205/0326* (2013.01); *F17C 2205/0335* (2013.01)

(58) Field of Classification Search
CPC ...... F17C 2205/0326; F17C 2205/0335; F17C 2205/0364
See application file for complete search history.

(56) References Cited

U.S. PATENT DOCUMENTS

| | | | |
|---|---|---|---|
| 2002/0007864 A1* | 1/2002 | Durkin | B65B 31/003 141/3 |
| 2003/0109058 A1* | 6/2003 | Bolam | A61K 49/1815 436/173 |
| 2011/0152849 A1* | 6/2011 | Baust | A61B 18/02 606/21 |
| 2014/0216080 A1* | 8/2014 | Doty | F17C 7/04 62/95 |

* cited by examiner

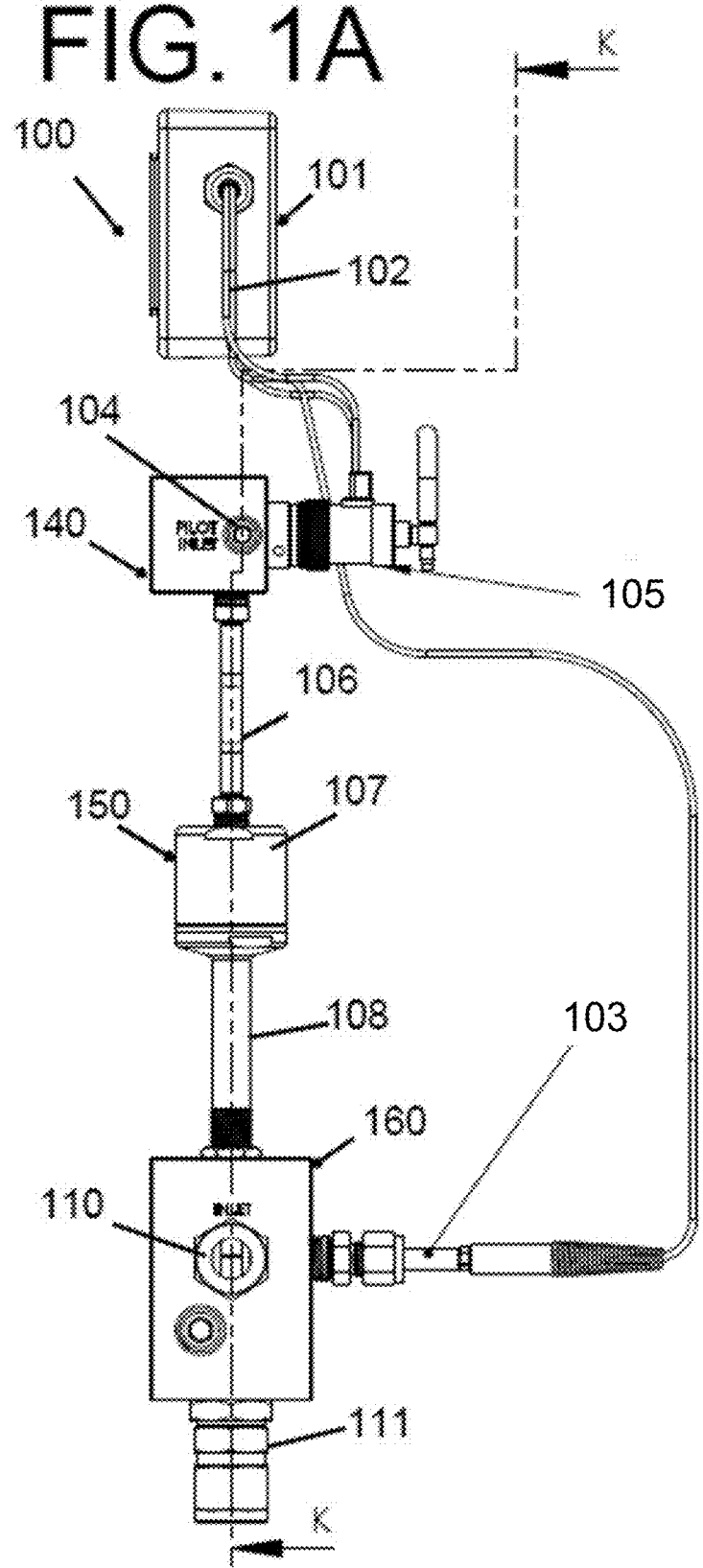

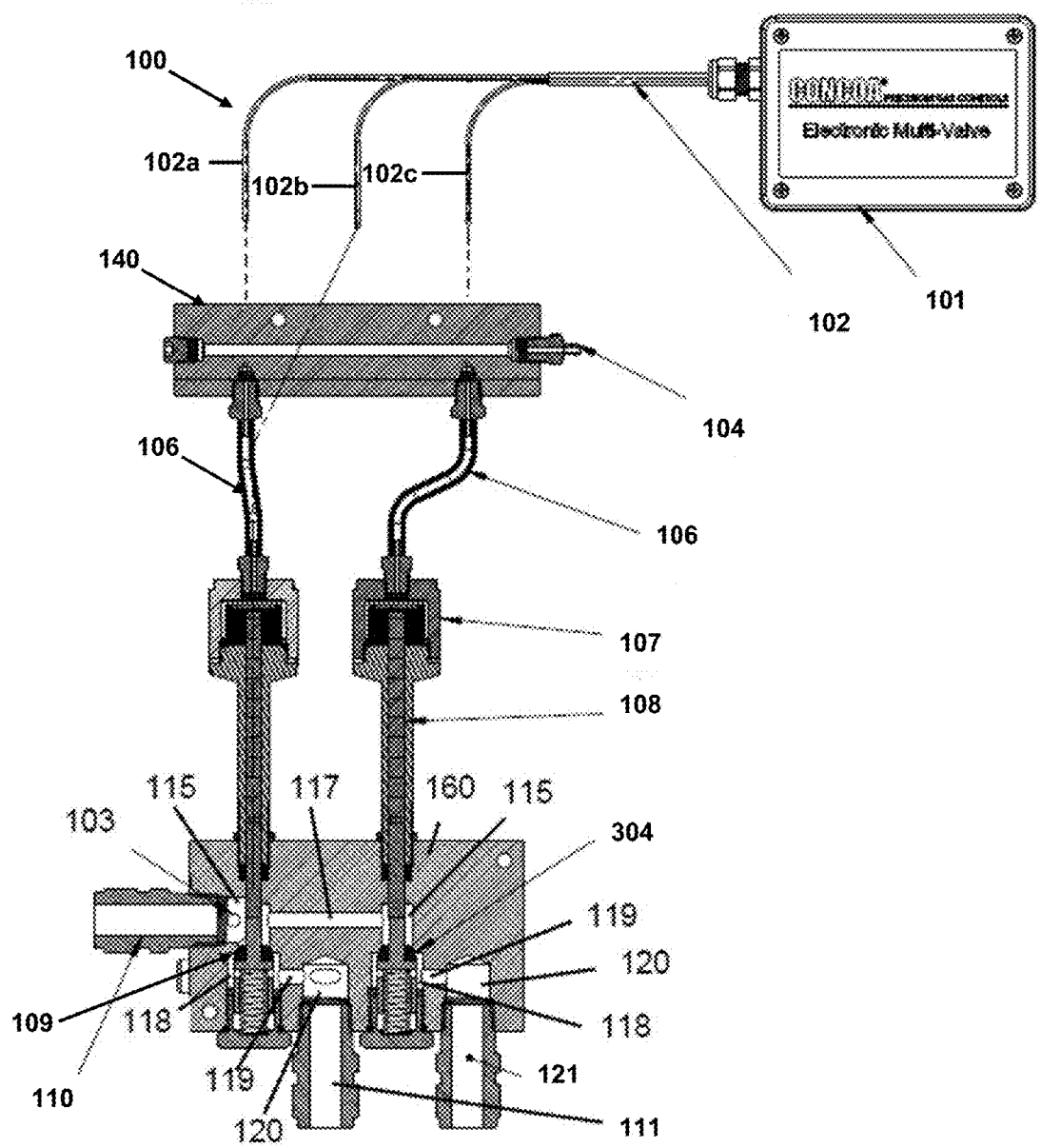

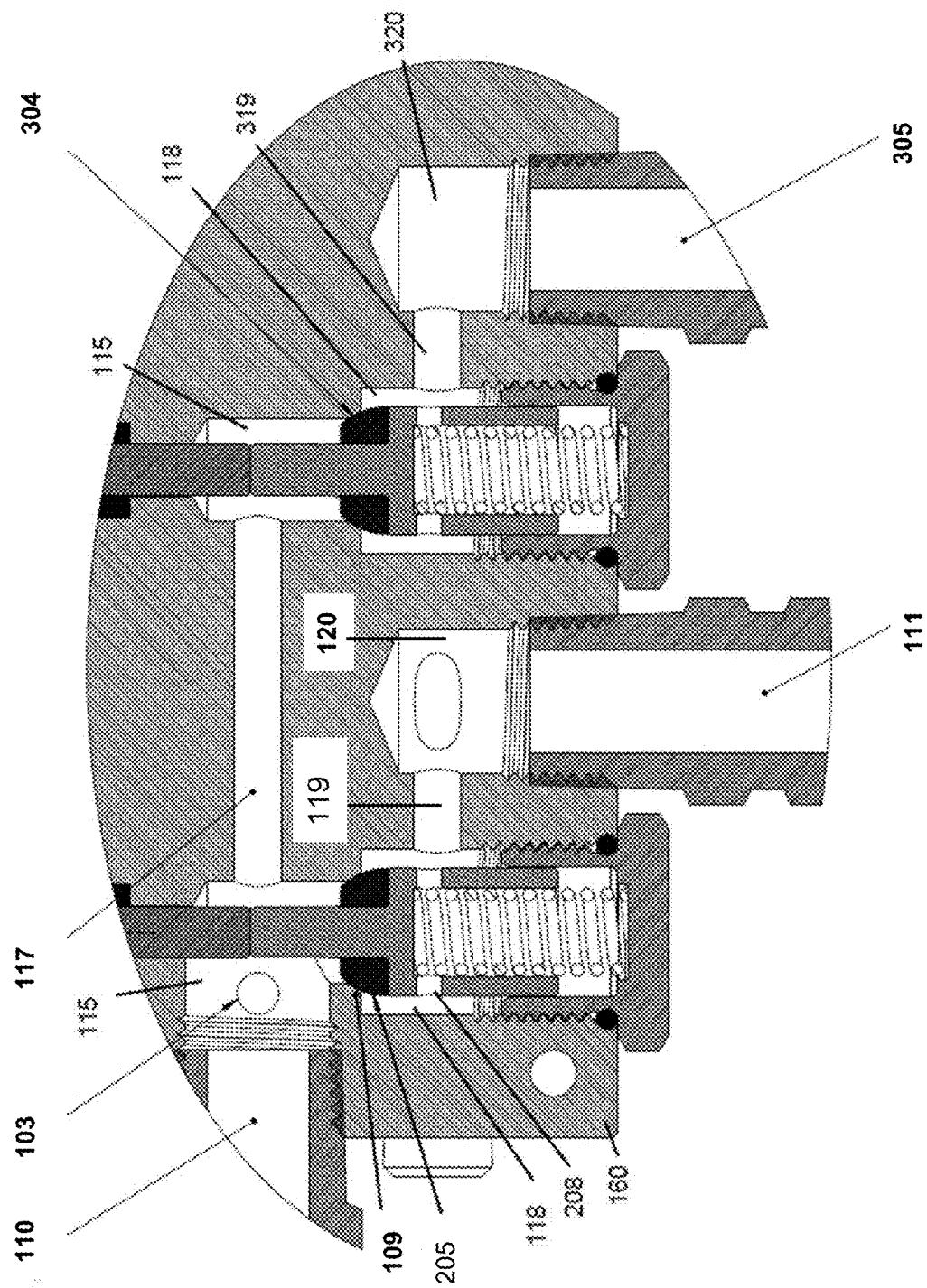

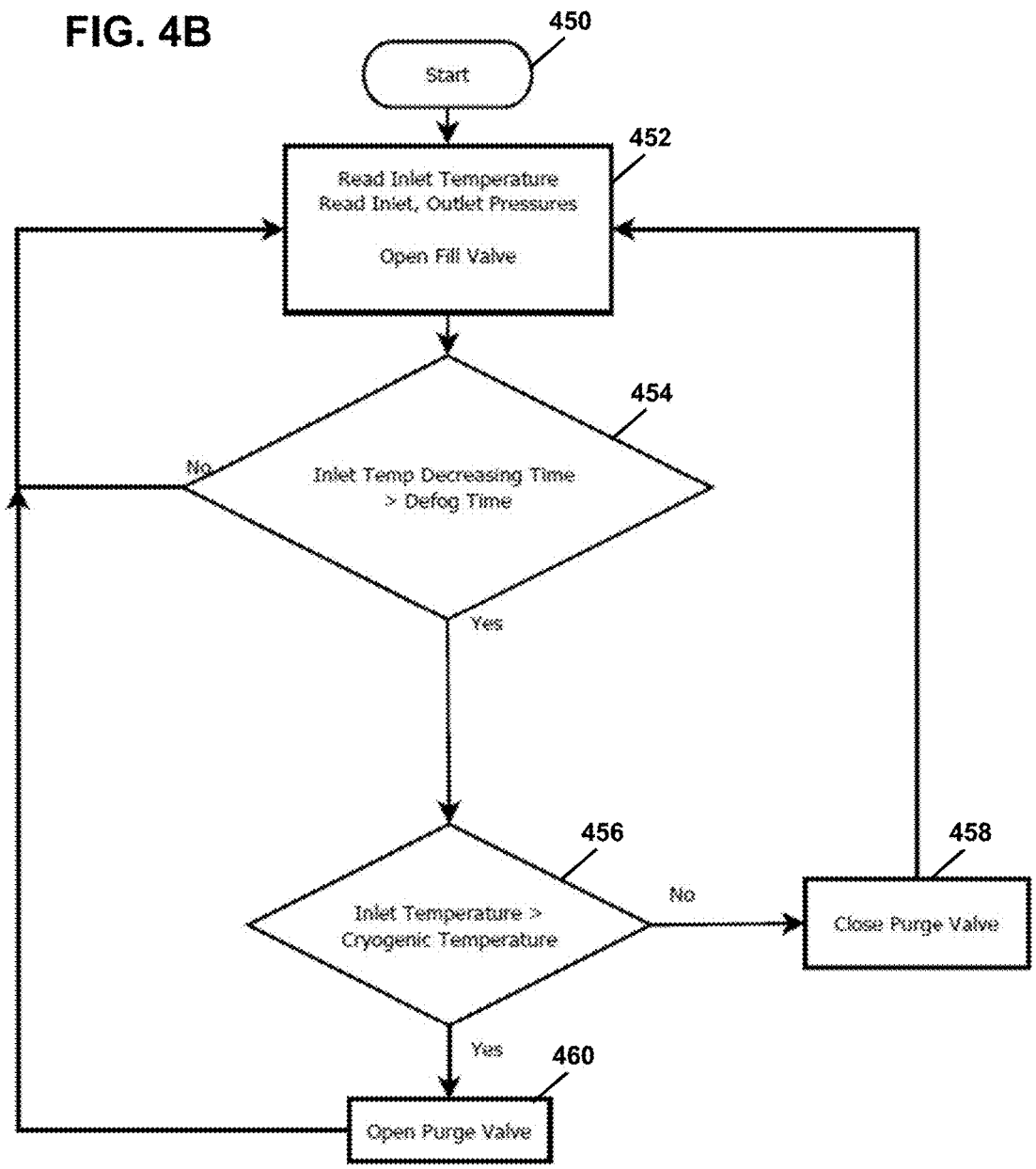

US 10,197,221 B1

AIR ACTUATED VALVES SWITCH AND SOFTWARE CONTROL SYSTEM FOR USE WITH CRYOGENIC LIQUID SYSTEMS

TECHNICAL AREA

Cryogenic liquid switchover systems. More particularly a cryogenic liquid switching system using a novel algorithm based on inputs from temperature and pressure based sensors.

CROSS-REFERENCE TO RELATED APPLICATIONS

This application claims the benefit of priority to U.S. Provisional Patent Application Ser. No. 61/921,314 filed on Dec. 27, 2013, the entire disclosure and teachings of which is hereby incorporated herein in its entirety.

SUMMARY

The cryogenic liquid switching system of the present invention provides a continuous supply of cryogenic fluid by switching seamlessly between two supply sources with minimal temperature change by using a novel algorithm that relies on temperature and pressure sensors to drive four air-actuated valves.

BRIEF DESCRIPTION OF THE DRAWINGS

Non-limiting and non-exhaustive embodiments of the present invention are described with reference to the following figures, wherein like reference numerals and/or indicia refer to like parts throughout the various views unless otherwise precisely specified.

FIG. 1A is a side view of an air actuated valve switch system, in accordance with an embodiment of the present invention.

FIG. 1B is a partial cross-sectional view along line K-K of the air actuated valve switch system in FIG. 1A, in accordance with an embodiment of the present invention.

FIG. 3 is a close-up, cross-sectional view along line K-K of both pneumatic valve mechanisms of the air actuated valve switch system in FIG. 1A, in accordance with an embodiment of the present invention.

FIG. 4B is a flow chart showing the logic of an on demand (with temperature sensitivity) control algorithm for controlling the switching between first and second sources of a cryogen in an air actuated valve switch system, in accordance with an embodiment of the present invention.

DETAILED DESCRIPTION

Figure 2A:
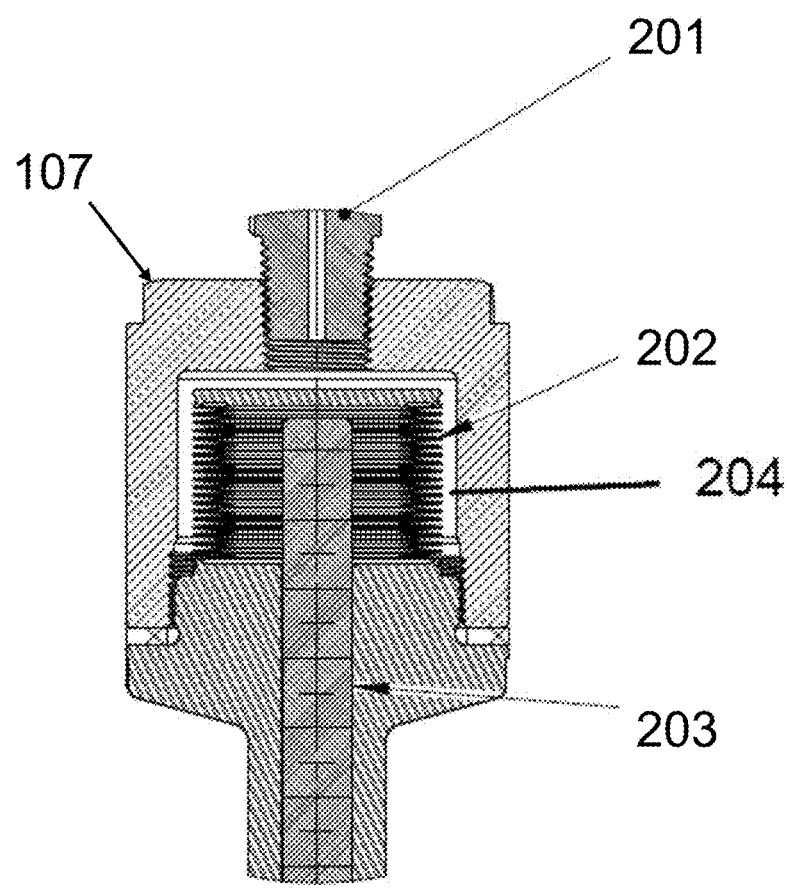
FIG. 2A is a close-up, cross-sectional view along line K-K of a pneumatic valve actuator of the air actuated valve switch system in FIG. 1A, in accordance with an embodiment of the present invention.

In general, one or more embodiments of the present invention include (i.e., comprise) a system having an air actuated valve switch system connected to and in fluid communication with a dry control gas supply line, a plurality of control gas purge lines, a plurality of cryogenic hoses, a water drain and a cryogenic liquid purge valve, the air actuated valve switch system including a plurality of cryogenic liquid connections with each attached to one of the plurality of cryogenic hoses and each cryogenic liquid connection being connected to and in fluid communication with a cryogenic liquid inlet, which is connected to and in fluid communication with upper inlet chambers above a cryogenic liquid fill valve and a cryogenic liquid purge valve, lower inlet chambers located below the cryogenic liquid fill valve and the cryogenic liquid purge valve, which are connected to and in fluid communication with a cryogenic liquid output and a purge liquid output, respectively, and a plurality of pneumatic bellows configured to actuate the cryogenic liquid fill valve and the cryogenic liquid purge valve. The system also includes a plurality of cryogenic liquid cylinders, such as nitrogen Dewars, each connected to and in fluid communication with one of the plurality of cryogenic hoses and at least one cryogenic freezer connected to and in fluid communication with the air actuated valve switch system via a freezer connection cryogenic hose connected to the cryogenic liquid output.

FIG. 1A is a side view of an air actuated valve switch system 100, in accordance with an embodiment of the present invention. In FIG. 1A, the air actuated valve switch system 100 includes (i.e., comprises) four electronically controlled pneumatic valves. Specifically, these valves include two inlet valves to control the flow of cryogenic liquid to the outlet of the device and two purge valves to redirect hot gas from the inlet to ensure that the optimal supply of cryogenic liquid is available and delivered to the outlet. If liquid nitrogen is used as the cryogenic liquid, which is a liquid between about −346° F. and −320° F., so for nitrogen to be a gas it has to have a temperature that is greater than −320° F. and is considered a hot gas. The air actuated valve switch system 100 includes an electronic control mechanism 101 that monitors pressures, temperatures and controls solenoid valves that open and close pneumatically actuated, high flow cryogenic valves that deliver the cryogenic liquid, e.g., liquid nitrogen, to an outlet with minimal disturbance in flow and almost no heat transfer. The electronic control mechanism 101 is connected via an interface cable 102 to a solenoid component 140 to enable receiving input from pressure and temperature monitors as well as to sending control signals to control the operation of solenoid valves 105. Specifically, the interface cable includes two solenoid input lines 102a, 102b (see FIG. 1B) that are communicatively connected to the solenoid component 140 to control the operation of the solenoid valves 105. The interface cable 102 is also communicatively connected to the temperature probe 103 via another input line 102c (see FIG. 1B), which monitors the temperature of the fluid entering the air actuated valve switch system 100. Note that the temperature probe 103 is located immediately inside the inlet connection housing to ensure accuracy of the measurement that will be delivered when the valve is opened.

In FIG. 1A, a control gas input 104 is connected to an inlet of the solenoid valves 105 and provides the gas supply for the pneumatically controlled cryogenic valves. The solenoid valves 105 are the valves that the electronic control mechanism 101 opens when necessary to allow a pressurized control gas, for example, a dry nitrogen gas at 75 to 100 psi, to be delivered via a control gas input 104 to a pneumatic valve actuator 107 in an actuator component 150. A first end of each of two sections of isolation tubing 106 are connected to an outlet of the solenoid valves 105 and at a second end to respective actuator components 150 to ensure that the control gas system is not affected by the cryogenic temperatures. The pneumatic valve actuator 107 is designed to isolate the cryogenic liquid from the control gas. This can be accomplished by using a cryogenic bellows design as shown in FIGS. 1A and 1B. The control gas delivered by the solenoid valve 105 causes the valve actuator 107 to depress and transfer its motion to a pneumatic valve actuator pin or a pneumatic valve pin 108. The pneumatic valve pin 108 transfers the pneumatic valve actuator 107 motion to a pneumatic valve 109 or a pneumatic purge valve 304 in a valve actuator component 160 (see FIG. 1B). In FIG. 1A, a cryogenic liquid inlet/input 110 is seen on a left side of the valve actuator component 160 and a cryogenic liquid outlet/output 111 is seen connected to and extending away from a bottom of the valve actuator component 160.

FIG. 1B is a partial cross-sectional view along line K-K of the air actuated valve switch system in FIG. 1A, in accordance with an embodiment of the present invention. In FIG. 1B each pneumatic valve 109 and each pneumatic purge valve 304 opens and closes to allow cryogenic fluid supplied to it via the cryogenic liquid input 110 to flow downstream to the cryogenic liquid output 111 and a purge liquid outlet/output 121 via a purge flow path passageway 117 and an exit channel 119. The cryogenic liquid entering through the cryogenic liquid input 110 flows past the temperature probe 103 and into an upper inlet chamber 115 above the pneumatic valve 109. The upper inlet chamber 115 closest to the cryogenic liquid input 110 is connected to and in fluid communication with the other upper inlet chamber 115 via the purge flow path passageway 117. When either the pneumatic valve 109 or the pneumatic purge valve 304 is in an open position, the upper inlet chamber 115 becomes in fluid communication with a lower inlet chamber 118. The lower inlet chamber 118 is in turn in fluid communication with the exit channel 119, which is in fluid communication with an outlet chamber 120 that is in turn in fluid communication with the cryogenic liquid output 111 or the purge liquid output 121.

FIG. 2A is a close-up, cross-sectional view along line K-K of a pneumatic valve actuator of the air actuated valve switch system in FIG. 1A, in accordance with an embodiment of the present invention. In FIG. 2A, a pneumatic valve actuator inlet 201, which, when the electronic control mechanism 101 sends a signal for the solenoid valve 105 to open, allows the control gas to enter the actuator component 150 via the pneumatic valve actuator inlet 201 and into a pneumatic valve actuator chamber 204. When the solenoid valve 105 is closed, it vents the gas from the pneumatic valve actuator chamber 204. Housed within the pneumatic valve actuator 107 is the pneumatic valve actuator chamber 204 that is designed to isolate the cryogenic liquid from the control gas. This isolation can be accomplished by the use of either of a bellows 202 or a sufficiently sealed cryogenic piston design. The control gas delivered by the solenoid valve 105 causes the pneumatic valve actuator 107, for example, the bellows 202, to depress and transfer its motion to a pneumatic valve pin 203 that in turn transfers the action of the pneumatic valve actuator 107 to the pneumatic valve 109 or the pneumatic purge valve 304.

Figure 2B:
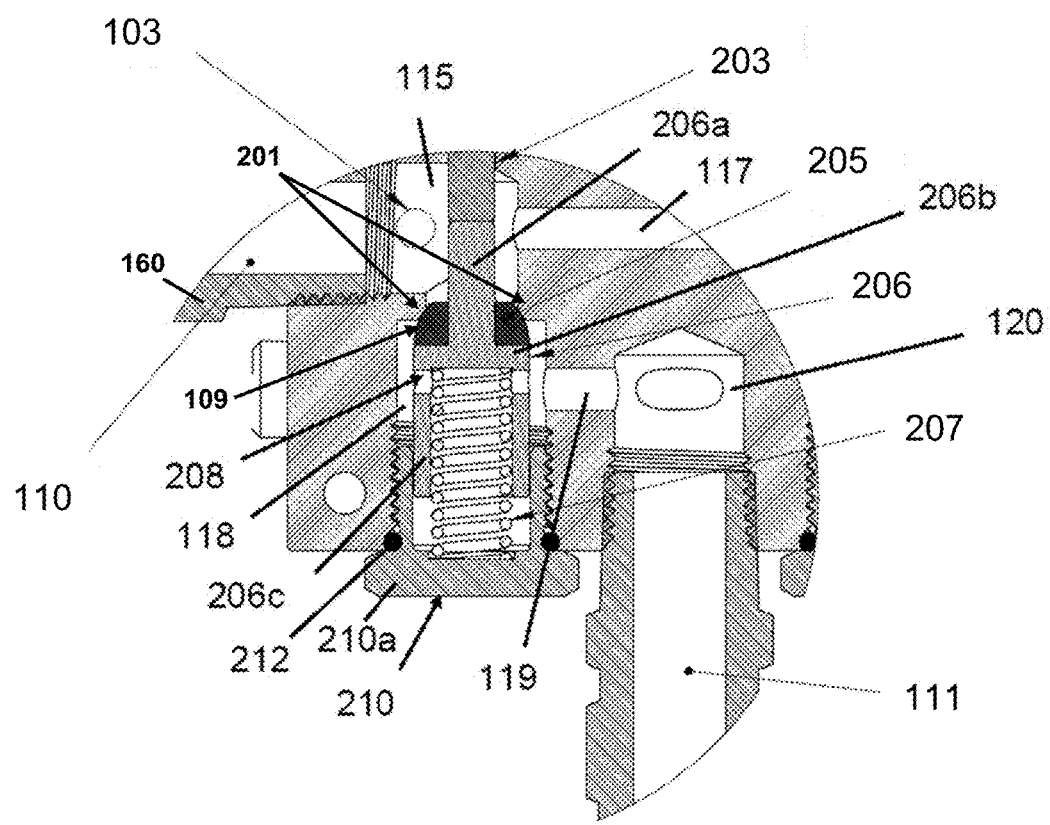
FIG. 2B is a close-up, cross-sectional view along line K-K of a single pneumatic valve mechanism of the air actuated valve switch system in FIG. 1A, in accordance with an embodiment of the present invention.

FIG. 2B is a close-up, cross-sectional view along line K-K of a single pneumatic valve mechanism of the air actuated valve switch system in FIG. 1A, in accordance with an embodiment of the present invention. In FIG. 2B, the temperature probe 103 is shown at a distal end of the cryogenic liquid input 110 to monitor the temperature of the fluid entering the device. Note that the location of the temperature probe 103 is immediately inside the inlet connection housing to ensure accuracy of the temperature measurement that will be delivered when the pneumatic valve is open. The pneumatic valve 109 includes a main valve seat 201, a main pneumatic valve seal 205 that opens and closes by moving away from moving toward to contact and form a liquid-tight seal against the main valve seat 201 to stop and allow, respectively, cryogenic fluid from flowing downstream of the device and a cryogenic valve seal holder 206 that in FIG. 2B appears, in cross-section, in a generally upside-down, "goal post"-shaped configuration (206a, 206b, 206c). The cryogenic valve seal holder 206 is connected at a proximal end to a distal end of the pneumatic valve pin 203 and the main pneumatic valve seal 205 is positioned around a vertical body portion 206a of the cryogenic valve seal holder 206 and against an upwardly facing surface of a substantially circular flange 206b that is connected and substantially perpendicular to a distal end of the pneumatic valve pin 203. In reality, the vertical body portion 206a is a rod similar in diameter to the pneumatic valve pin 203 and the substantially circular flange 206b is connected to a substantially cylindrical portion 206c that depends downwardly from a bottom surface of the substantially circular flange 206b. Opposing pressure relief passages 208 extend through a bottom portion of the substantially cylindrical portion 206c to permit fluid communication between the lower inlet chamber 118 and an inside of the substantially cylindrical portion 206c and a cryogenic valve return spring 207. The cryogenic valve return spring 207 is positioned below and biased against a bottom surface of the cryogenic valve seal holder 206 to help keep the main pneumatic valve seal 205 in its closed position when the pneumatic valve actuator 107 is in its expanded state. At the bottom of the lower inlet chamber 118, a pressure cap 210 is threadingly engaged with reciprocal threads in a bottom of the valve actuator component 160 and a seal is effectuated by an "O"-ring 212 that is positioned between a bottom surface of a top flange portion 210a of the pressure cap 210 and a bottom surface of the valve actuator component 160. As shown in FIG. 2B, the cryogenic liquid input 110 and the cryogenic liquid output 111 are also connected to the valve actuator component 160 by being threadingly engaged with reciprocal threads in a side and the bottom, respectively, of the valve actuator component 160. However, instead of an "O"-ring being used to help seal the connection, a sealing element, for example, but not limited to, a thread sealant or a Teflon tape with or without halocarbon grease (not explicitly shown) can be applied to the threads.

FIG. 3 is a close-up, cross-sectional view along line K-K of both pneumatic valve mechanisms of the air actuated valve switch system in FIG. 1A, in accordance with an embodiment of the present invention. In FIG. 3, an end of the cryogenic liquid input 110 is shown adjacent to the temperature probe 103, which monitors the temperature of the fluid entering the device and provides the temperature information to the electronic control mechanism 101 to determine whether to open the pneumatic valve 109. As noted above, the location of the temperature probe 103 is immediately inside the inlet connection housing to ensure the accuracy of the measurement of the temperature of the cryogenic liquid. Connected to and being in fluid communication with the upper inlet chamber 115 of the pneumatic valve 109 is a first end of a purge flow path passageway 117. A second end of the purge flow path passageway 117 is connected to and in fluid communication with the upper inlet chamber 115 of a cryogenic purge valve 304. The purge flow path passageway 117 enables purge gas to be drawn through the upper inlet chamber 115 of the pneumatic valve 109 until the correct temperature of the cryogenic liquid is detected by the temperature probe 103. To ensure that downstream equipment is only delivered cryogenic fluid at the desired temperature, the cryogenic purge valve 304 is opened by the electronic control mechanism 101 first and the incorrect temperature cryogenic fluid flows through the upper inlet chamber 115 of the cryogenic purge valve 304, through a purge valve exit channel 319, into a purge valve exit chamber 320 and then out through a purge gas output 305. The electronic control mechanism 101 monitors the temperature probe 103 output for cryogenic fluid temperature prior to opening the pneumatic valve 109 in a main cryogenic liquid output 111. The pneumatic valve 109 will open once the electronic control mechanism 101 determines that the desired temperature for the cryogenic fluid has been measured at the temperature probe 103.

Figure 4A:
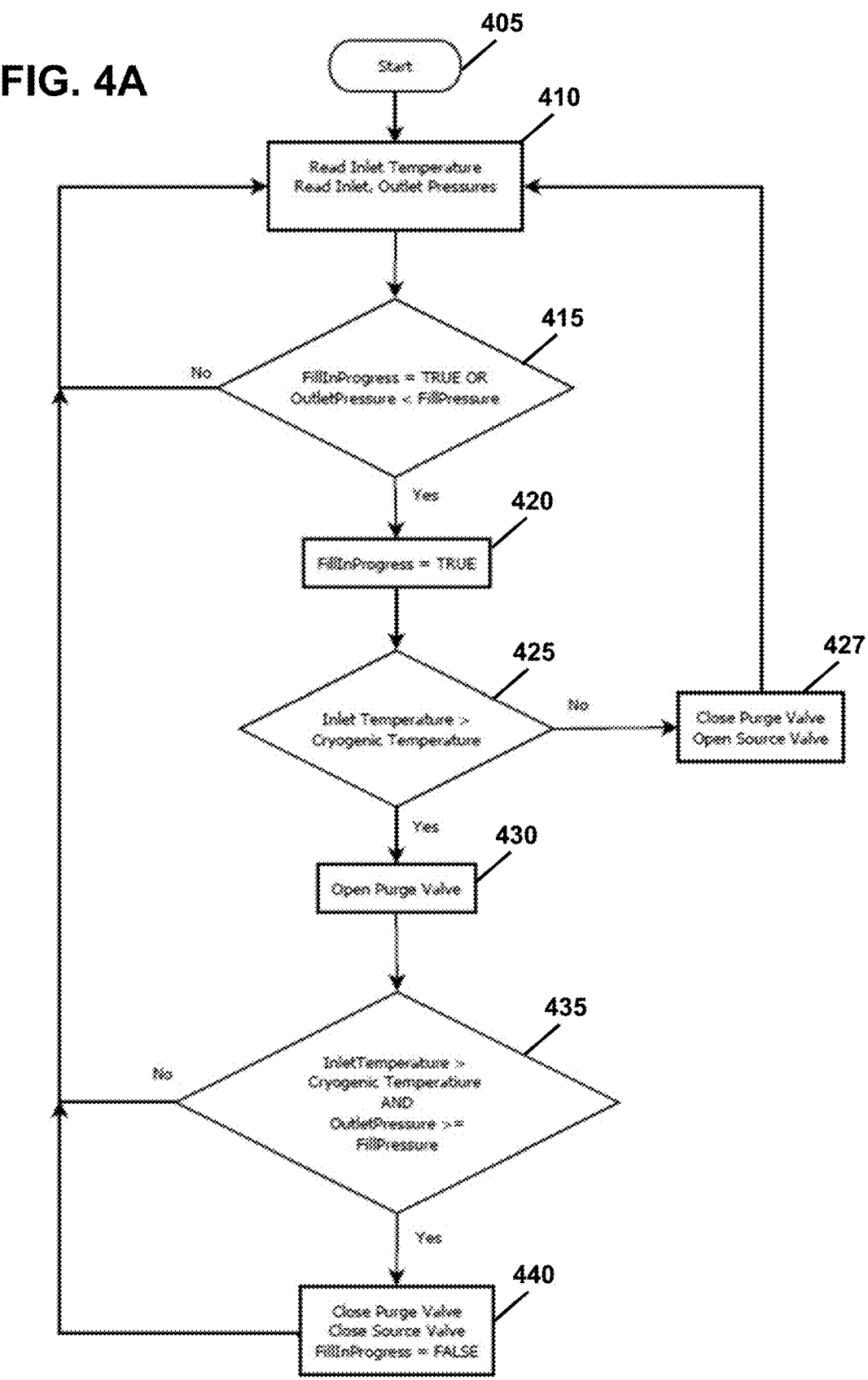
FIG. 4A is a flow chart showing the logic of an on demand (with pressure and temperature sensitivity) control algorithm for controlling the switching between first and second sources of a cryogen in an air actuated valve switch system, in accordance with an embodiment of the present invention.

FIG. 4A is a flow chart showing the logic of an on demand (with pressure and temperature sensitivity) control algorithm for controlling the switching between first and second sources of a cryogen in an air actuated valve switch system, in accordance with an embodiment of the present invention. In FIG. 4A, the process starts (405) and then reads (410) an inlet temperature of a cryogenic liquid, an inlet cryogenic liquid pressure and an outlet cryogenic liquid pressure. Next, the process determines (415) whether a fill in progress variable is "TRUE" or whether an outlet pressure is less than ("<") a fill pressure. If the answer is determined (415) to be "FALSE," then the process loops back and repeats reading (410) the inlet temperature of the cryogenic liquid, the inlet cryogenic liquid pressure and the outlet cryogenic liquid pressure and the process continues. However, if the answer is determined (415) to be "TRUE," then the process sets (420) the fill in progress variable to equal "TRUE" and then determines (425) whether the inlet temperature of the cryogenic liquid is greater than (">") the cryogenic temperature in the cryogenic freezer(s). If the answer is determined (425) to be "FALSE," then the process closes (427) the purge valve and opens (427) the source valve and then loops back and repeats reading (410) the inlet temperature of the cryogenic liquid, the inlet cryogenic liquid pressure and the outlet cryogenic liquid pressure and the process continues as before. However, if the answer is determined (425) to be "TRUE," then the process opens (430) the purge valve and then determines (435) whether the inlet temperature of the cryogenic liquid is greater than (">") the cryogenic temperature in the cryogenic freezers and whether the outlet cryogenic liquid pressure is greater than or equal to (">=") the cryogenic liquid fill pressure. If the answer is determined (435) to be "FALSE," then the process loops back and repeats reading (410) the inlet temperature of the cryogenic liquid, the inlet cryogenic liquid pressure and the outlet cryogenic liquid pressure and the process continues as before. However, if the answer is determined (435) to be "TRUE," then the process closes (440) the purge and source valves, sets the fill in progress variable to "FALSE," and then the process loops back and repeats reading (410) the inlet temperature of the cryogenic liquid, the inlet cryogenic liquid pressure and the outlet cryogenic liquid pressure and the process continues as before.

FIG. 4B is a flow chart showing the logic of am on demand (with temperature sensitivity) control algorithm for controlling the switching between first and second sources of a cryogen in an air actuated valve switch system, in accordance with an embodiment of the present invention. During the on demand process the fill valve is always open to accommodate output device functions such as, but not limited to, "defog" and "quick chill" functions. In FIG. 4B, the process starts (450) and then reads (452) an inlet temperature of a cryogenic liquid, an inlet cryogenic liquid pressure and an outlet cryogenic liquid pressure and opens a fill valve. Next, the process determines (454) whether the inlet temperature has been decreasing for greater than (">") a predefined defog time. If the answer is determined (454) to be "FALSE," then the process loops back and repeats reading (452) the inlet temperature of the cryogenic liquid, the inlet cryogenic liquid pressure and the outlet cryogenic liquid pressure and the process continues. However, if the answer is determined (454) to be "TRUE," then the process determines (456) whether the inlet temperature of the cryogenic liquid is greater than (">") the cryogenic temperature in the cryogenic freezer(s). If the answer is determined (456) to be "FALSE," then the process closes (458) the purge valve and then loops back and repeats reading (452) the inlet temperature of the cryogenic liquid, the inlet cryogenic liquid pressure and the outlet cryogenic liquid pressure and the process continues as before. However, if the answer is determined (456) to be "TRUE," then the process opens (460) the purge valve and then the process loops back and repeats reading (452) the inlet temperature of the cryogenic liquid, the inlet cryogenic liquid pressure and the outlet cryogenic liquid pressure and the process continues as before.

Figure 4C:
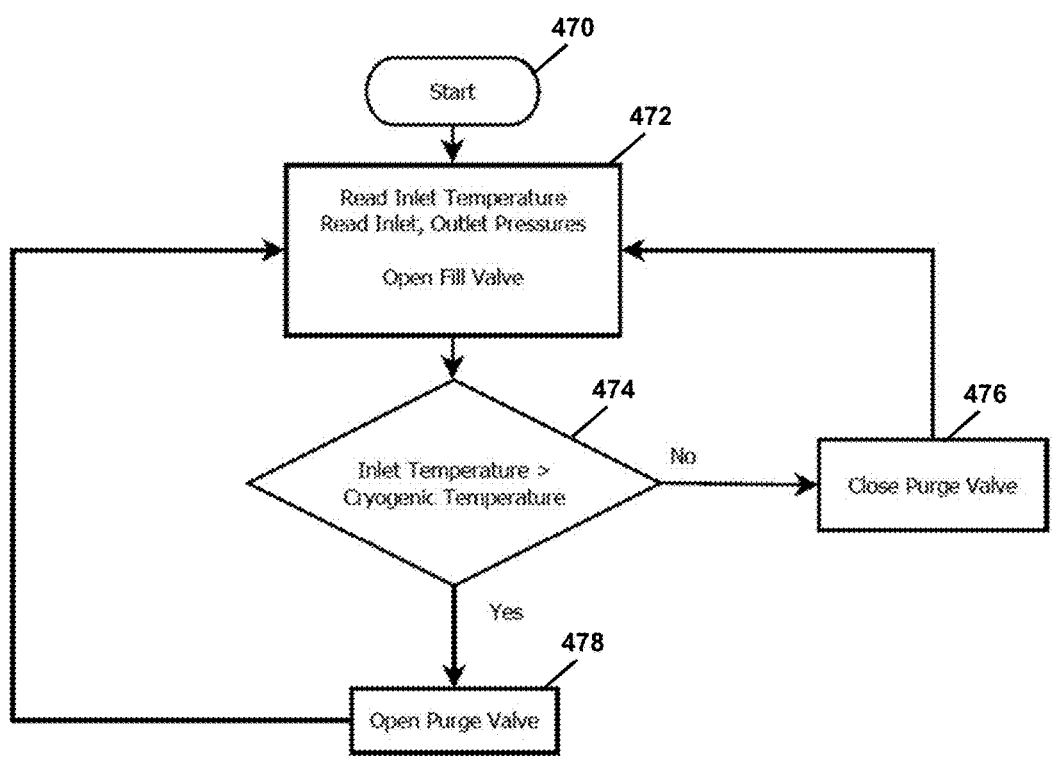
FIG. 4C is a flow chart showing the logic of a keep full control algorithm for controlling the switching between first and second sources of a cryogen in an air actuated valve switch system, in accordance with an embodiment of the present invention.

FIG. 4C is is a flow chart showing the logic of a keep full control algorithm for controlling the switching between first and second sources of a cryogen in an air actuated valve switch system, in accordance with an embodiment of the present invention. During this process the fill valve is always open to accommodate output device functions such as but not limited to "defog" and "quick chill". In FIG. 4C, the process starts (470) and then reads (472) an inlet temperature of a cryogenic liquid, an inlet cryogenic liquid pressure and an outlet cryogenic liquid pressure and opens a fill valve. Next, the process determines (474) whether the inlet temperature of the cryogenic liquid is greater than (">") the cryogenic temperature in the cryogenic freezer(s). If the answer is determined (474) to be "FALSE," then the process closes (476) the purge valve and then loops back and repeats reading (472) the inlet temperature of the cryogenic liquid, the inlet cryogenic liquid pressure and the outlet cryogenic liquid pressure and the process continues as before. However, if the answer is determined (474) to be "TRUE," then the process opens (478) the purge valve then the process loops back and repeats reading (472) the inlet temperature of the cryogenic liquid, the inlet cryogenic liquid pressure and the outlet cryogenic liquid pressure and the process continues as before.

Figure 5:
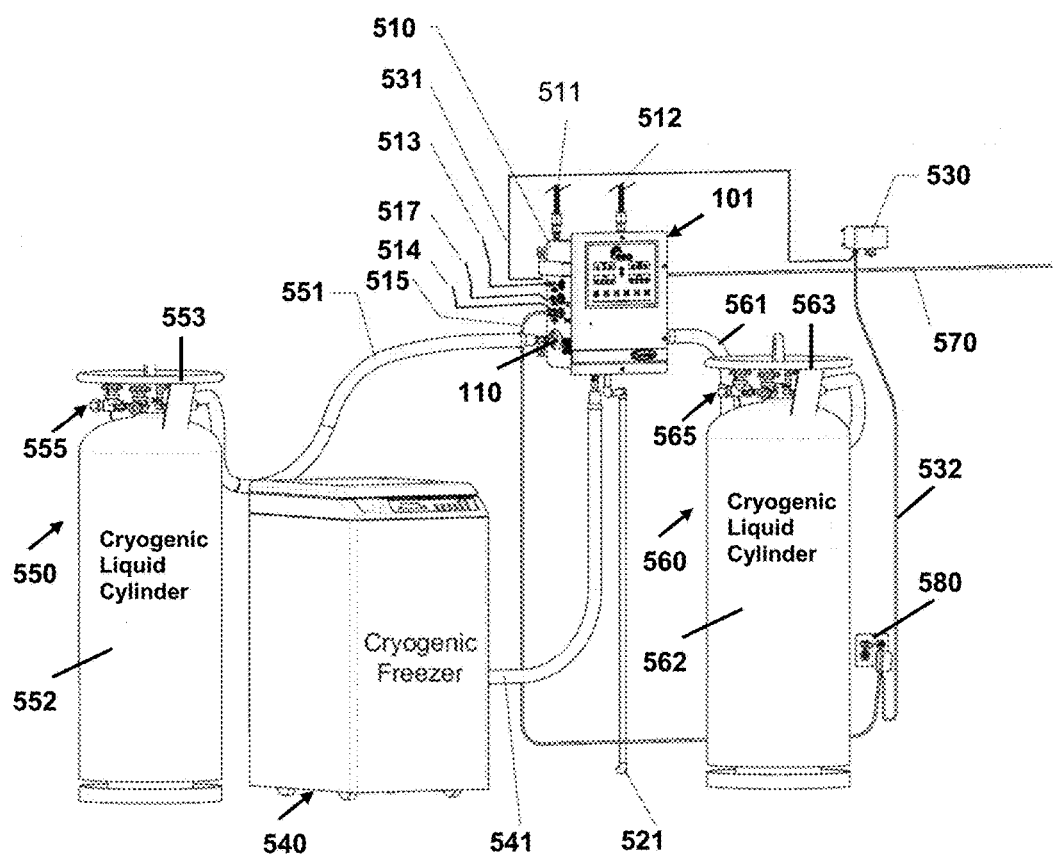
FIG. 5 is a system diagram showing an air actuated valve switch system connected to a cryogenic freezer and two cryogenic liquid storage vessels, in accordance with an embodiment of the present invention.

FIG. 5 is a system diagram showing an air actuated valve switch system connected to a cryogenic freezer and two cryogenic liquid storage cylinders, in accordance with an embodiment of the present invention. In FIG. 5, a system 500 is shown to include an air actuated valve switch system 510 that is connected to and in fluid communication with a cryogenic freezer 540 via a freezer inlet and outlet cryogenic hose 541, a first cryogenic liquid storage cylinder, e.g., a first liquid nitrogen Dewar, 550 via a first inlet and outlet cryogenic hose 551, and a second cryogenic liquid storage cylinder, e.g., a second liquid nitrogen Dewar, 560 via a second inlet and outlet cryogenic hose 561. In this example, which uses liquid nitrogen Dewars, each of the liquid nitrogen Dewars has an operating pressure of 22 to 35 psi. Each of the first and second liquid nitrogen storage Dewars 550, 560 include a body portion 552, 562, respectively, a substantially annular top 553, 563 that is fixedly connected to a top section of the body portion 552, 562, respectively, and inlet and outlet connections 555, 565, respectively. In general, while in FIG. 5 the body portions 552,562 are shown to have a substantially cylindrical shape, other shapes and configurations can be used.

In FIG. 5, the air actuated valve switch system 510 is also shown connected via an oxygen deficiency monitor input line 531 to and in fluid communication with an oxygen deficiency monitor 530 that is connected to a power supply cord with AC/DC converter/adapter 532 for connection to a power source 580, e.g., a 110/120 VAC power source. The oxygen deficiency monitor 530 includes an output contact that is connected via the oxygen deficiency monitor input line 531 to a terminal strip on the air actuated valve switch system 510 and when the oxygen alarm relay contact is broken an alarm condition is indicated, for example, by illuminating an LED on the air actuated valve switch system 510 and automatically shutting down the system. The air actuated valve switch system 510 is further connected to and in fluid communication with a water drain pipe 521, which is in turn connected to and in fluid communication with a drain (not shown) to permit the removal of condensed water that accumulates due to the cold temperature of the cryogenic fluid.

In FIG. 5, the air actuated valve switch system 510 includes an away purge gas pipe 511 for the purging of hot gas from the inlet valves to ensure an optimal supply of cryogenic liquid is available and delivered to the outlet valve to supply the cryogenic freezer 540, an away system relief valve pipe 512 for the venting of pressures released from the internal relief valves to a remote location, a remote alarm output 513 for connection to a remote alarm, an Ethernet port 514 to permit connection to a network and/or directly to a computer and/or remote alarm and permits the system to be monitored remotely and permit email communication and remote configuration, a power cord 515 for connection to a 110/120 VAC power source, an USB port 517 to permit connection to permit connection by installation technicians during installations and system configuration. The air actuated valve switch system 510 is also seen connected to a dry nitrogen supply line 570 that can provide nitrogen gas at 75-100 psi, which is used to pneumatically control the operation of the solenoid valve 140 and actuator 150, including the bellows-type valve actuator 107. The actuator 150 in turn controls the operation of the cryogenic valves 109, which control the inflow and outflow of cryogenic fluid going into and coming out of the cryogenic freezer 540.

Figure 6:
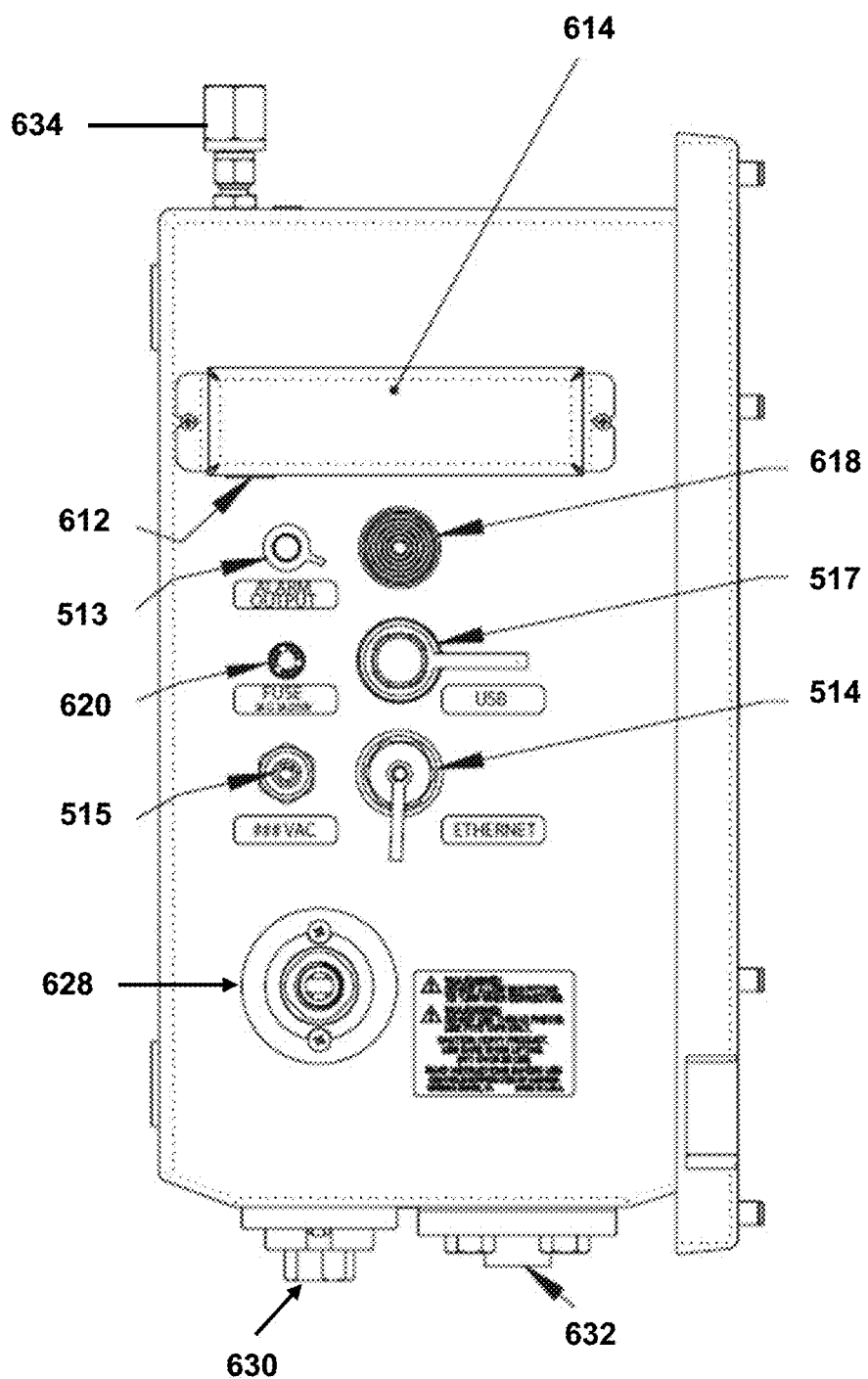
FIG. 6 is a left side view of an air actuated valve switch system, in accordance with an embodiment of the present invention.

FIG. 6 is a left side view of an air actuated valve switch system, in accordance with an embodiment of the present invention. In FIG. 6, the left side of the air actuated valve switch system 510 includes a terminal block access hole 612 that is covered by a cover 614 near a top end of the air actuated valve switch system 510. The remote alarm output connection 513, which permits connection to a remote alarm, is located below the terminal block access hole 612 and to the left of an audible alarm 618, which will sound upon the triggering of an alarm state within the system. A fuse 620 is located below the remote alarm output connection 513 and to the left of the USB port 517. The power cord 515 is located below the fuse 620 and connects to the side of the air actuated valve switch system 510 to the left of the Ethernet port 514. The Ethernet port 514 can be used with an optional, integral Web Server to permit remote monitoring of functions, e-mail and remote configuration of the air actuated valve switch system 510. A left cryogenic liquid input port 628 is located below the power cord 515 connection and the Ethernet port 514 for connecting with the cryogenic hose 531 from the first Nitrogen Dewar 552. A cryogenic liquid output port 630 is located on a back portion of a bottom of the air actuated valve switch system 510 for connecting with the cryogenic output hose 531 to supply liquid Nitrogen to the cryogenic freezer 540. A drain pipe connection 632 is located on a front portion of the bottom of the air actuated valve switch system 510 for connecting with the water drain pipe 521 to drain any moisture that condenses on the inside of the air actuated valve switch system 510. A purge gas pipe vent connection 634 is located on a top of the air actuated valve switch system 510 for connection to the purge gas pipe 511 to permit the automatic and manual purging of waste cryogenic liquid from the system.

Figure 7A:
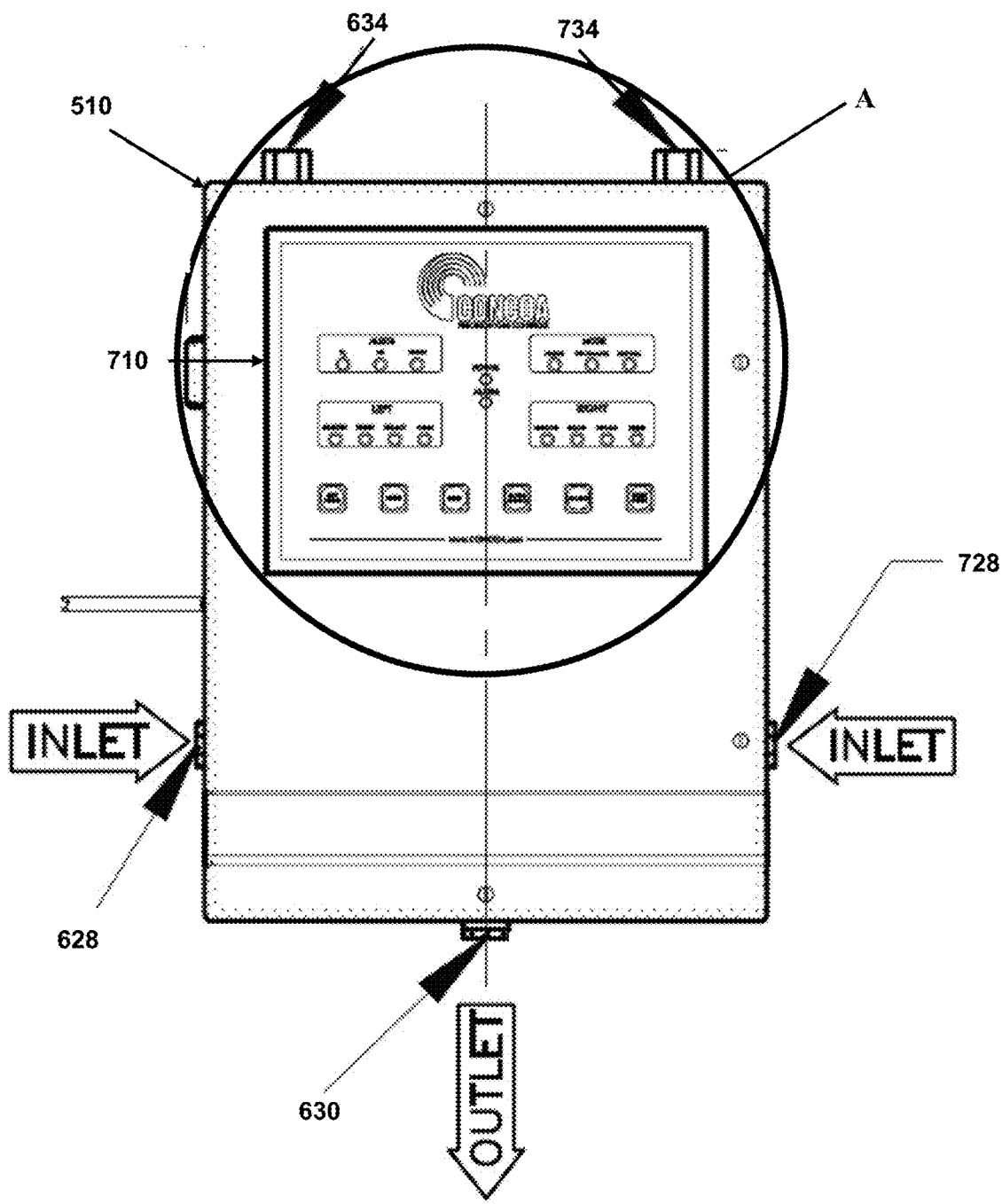
FIG. 7A is a front view of an air actuated valve switch system, in accordance with an embodiment of the present invention.

FIG. 7A is a front view of an air actuated valve switch system, in accordance with an embodiment of the present invention. In FIG. 7A, the front of the air actuated valve switch system 510 is shown to include an operator control panel 710, which can be used by an operator to control the operation of the system. The left cryogenic liquid inlet port 628 and a right cryogenic liquid inlet port 728 are seen on opposite sides of the air actuated valve switch system 510 and a bottom cryogenic liquid outlet port 630 is seen on the bottom of the air actuated valve switch system 510. The purge gas pipe vent connection 634 is located on the top left of the air actuated valve switch system 510 and an opposite end of the purge gas pipe vent connection 634 that is located inside the air actuated valve switch system 510 is connected to and in fluid communication with two hot gas bypasses, one for the left side and one for the right side of the system. A relief gas pipe vent connection 734 is located on the right of the top of the air actuated valve switch system 510 for connection to the relief gas pipe 512 for the venting of pressures released from the internal relief valves to a remote location. An opposite end of the relief gas pipe vent connection 734 that is located inside the air actuated valve switch system 510 is connected to and in fluid communication with three internal cryogenic relief valves, e.g., 35 Psig or 50 Psig relief valves, that protect the system from pressure increases that can occur due to the vaporization and/or trapping of cryogenic liquid during operation of the system.

Figure 7B:
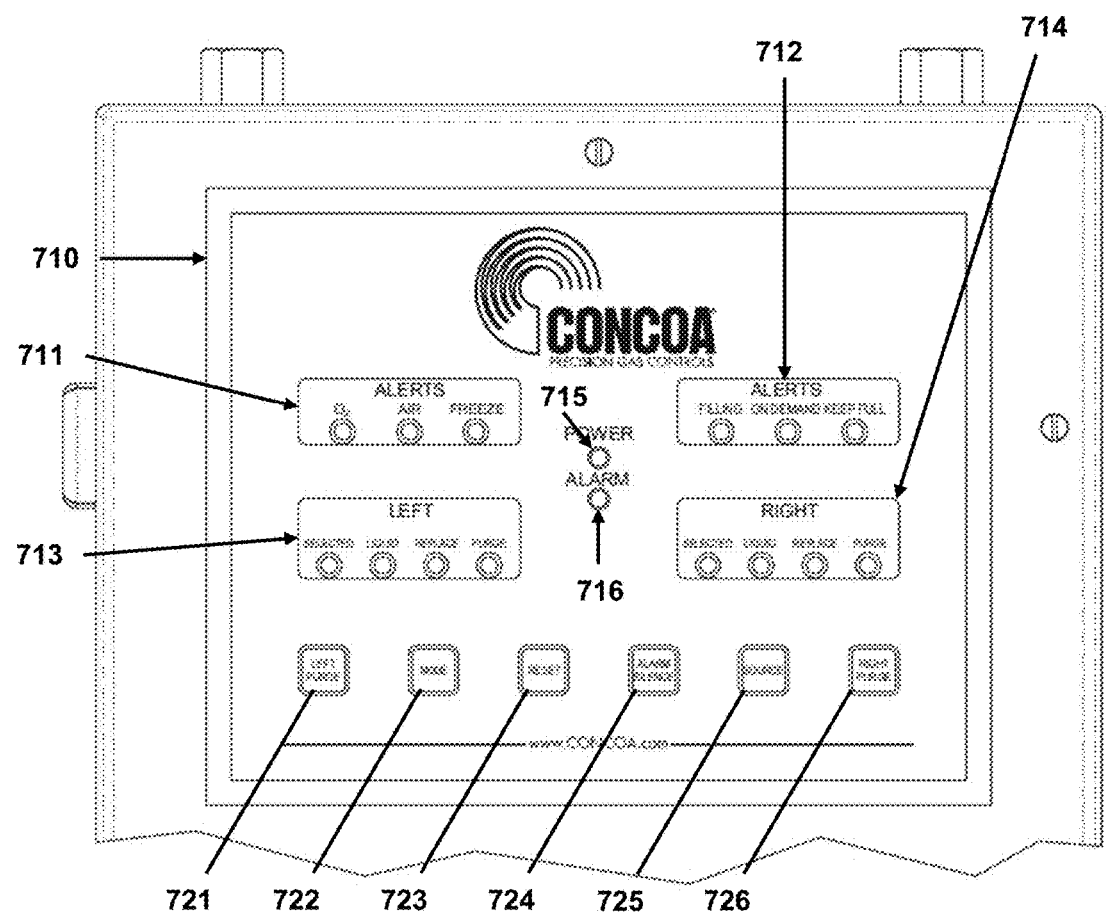
FIG. 7B is a close-up view of area A from the front view of the air actuated valve switch system in FIG. 7A, in accordance with an embodiment of the present invention.

FIG. 7B is a close-up view of area A from the front view of the air actuated valve switch system in FIG. 7A, in accordance with an embodiment of the present invention. In FIG. 7B, the operator control panel 710 includes four alert areas 711, 712, 713, 714 with lights, for example, LEDs, that indicate the status of the major components of the system, a power indication light 715 and an alarm indication light 716, and six control buttons 721, 722, 723, 724, 725, 726 that permit a user to control the operation of the system. In a first alert area 711, there are three status lights indicating whether there are problems. The first light located below the "O$_2$" label indicates whether there is an oxygen deficiency in the air surrounding the system and when lit indicates an alarm situation exists and the system is shut down. The second light, which is located below the "AIR" label indicates whether the required level of air pressure of the nitrogen gas to drive the pneumatic actuated valves is available and when lit indicates that there is not enough pressure, i.e., the air pressure is less than 65 psig, so an alarm situation exists. The third light, which is located below the "FREEZE" label indicates whether one of the high flow rate cryogenic valve in the system has frozen shut and necessitates that the cryogenic liquid supply to that valve be shut off to permit the valve to defrost and when lit indicates that the valve is frozen and has been shut.

In FIG. 7B, in a second alert area 712, there are also three status lights indicating the operational mode of the system. The first light located below the "FILLING" label indicates whether the system is filling the freezer 540 and, if so, the light is lit to indicate that it is being filled. The second light, which is located below the "ON DEMAND" label indicates whether the system is in the on-demand mode of operation and when lit indicates that this is the selected mode. The on-demand mode can either operate with pressure and temperature sensitivity, or with just temperature sensitivity. This distinction can be selected via a USB port/connection during system configuration. In the on-demand mode with pressure and temperature sensitivity, both source valves, e.g., a primary source valve and a reserve source valve, for the cryogenic liquid are closed until the system detects a fill or demand for cryogenic liquid be delivered. When this occurs, the purge valve for the primary supply side is opened and hot gas is purged through the purge gas connection 511 and out of the system. This purging continues until the system detects that cryogenic liquid has reached the primary source valve at which time the primary source valve is opened and the cryogenic liquid is delivered to the cryogenic liquid output port 630 and on to the cryogenic freezer 540 via the outlet pipe 541 until the fill is complete at which time the primary source valve is closed. While the filling or demand cycle is in process, the system continually monitors for the presence of the cryogenic liquid at the selected valve. If the system detects a lack of the cryogenic liquid at the selected valve, the system tries to automatically purge the supply and shut the selected valve. If the cryogenic liquid does not quickly return to the selected valve, the system switches to the reserve source valve and begins the purging process at the reserve source valve and as soon as the cryogenic liquid is detected at the reserve source valve, the reserve source valve is opened to continue delivering the cryogenic liquid to the cryogenic liquid output port 630 and on to the cryogenic freezer 540 via the outlet pipe 541 until the fill is complete at which time the primary source valve is closed.

In the on-demand mode with temperature sensitivity, a selected source valve for the cryogenic liquid remains open at all times to accommodate output device functions such as, but not limited to, "defog" and "quick chill" functions. The purge valve remains closed until the system detects a "fill" which is defined as temperature dropping for a continued period of time greater than a configurable, i.e., definable, "defog time." When this occurs, the purge valve for the primary supply side is opened and hot gas is purged through the purge gas connection 511 and out of the system. This purging continues until the system detects that cryogenic liquid has reached the primary source valve. If the selected side pressure drops below a configurable "switchover pressure point", the system switches to the reserve source valve and begins the purging process at the reserve source valve and as soon as the cryogenic liquid is detected at the reserve source valve. The third light, which is located below the "KEEP FULL" label indicates whether the system is in the keep full mode of operation and when lit indicates that this is the selected mode. In the keep full mode, the primary source valve is kept in the open position and the reserve source valve is kept closed. When the keep full mode is selected the system purges both source valves so that the cryogenic liquid is maintained at both source valves. This ensures that the cryogenic liquid is immediately available from both sources to respond to a DEMAND or Fill required state. If the system detects that the cryogenic liquid is no longer available at the primary source valve, the system automatically switches to the reserve source valve to maintain a constant supply of the cryogenic liquid.

In FIG. 7B, in a third alert area 713, there are four status lights indicating the operational status of the left source valve. The first light located below the "SELECTED" label indicates whether the left source valve is in use and when lit indicates the left source valve is in use. The second light, which is located below the "LIQUID" label indicates whether the cryogenic liquid is available at the left source valve and when lit indicates that there is cryogenic liquid at the left source valve. The third light, which is located below the "REPLACE" label indicates whether the left Dewar is empty and needs to be replaced and when lit indicates that the left cryogenic Dewar is empty and needs to be replaced with a full cryogenic liquid Dewar. The fourth light, which is located below the "PURGE" label indicates whether the left Dewar is being purged of hot gas and when lit indicates that the left cryogenic liquid Dewar is being purged of hot gas.

In FIG. 7B, in a fourth alert area 713, there are also four status lights indicating the operational status of the right source valve. The first light located below the "SELECTED" label indicates whether the right source valve is in use and when lit indicates the right source valve is in use. The second light, which is located below the "LIQUID" label indicates whether the cryogenic liquid is available at the right source valve and when lit indicates that there is cryogenic liquid at the right source valve. The third light, which is located below the "REPLACE" label indicates whether the right Dewar is empty and needs to be replaced and when lit indicates that the right cryogenic Dewar is empty and needs to be replaced with a full cryogenic liquid Dewar. The fourth light, which is located below the "PURGE" label indicates whether the right Dewar is being purged of hot gas and when lit indicates that the right cryogenic liquid Dewar is being purged of hot gas.

Also in FIG. 7B, a power light 715 is located in about the center of the control panel 710 and when lit indicates that the system is on and has power and when off indicates that the power is not on. Just below the power light 715 is an alarm light 716, which when lit indicates the presence of an alarm condition and the audible alarm 618 may also be sounding and/or, if connected, an alarm signal can also be sent to a remote alarm.

Still further, in FIG. 7B, the six control buttons 721, 722, 723, 724, 725, 726 are spaced across a bottom area of the control panel 710. A left purge button 721 controls the manual purging of the left source valve and when pressed and held by the user purges the left source valve until the button is released. A mode button 722 controls in which mode the system is operating as indicated by the lights in the second alert area 712. A reset button 723, when pressed, resets the alarm status messages. An alarm silence button 724, when pressed, silences the audible alarm 618. A source button 725, when pressed, changes from a currently selected source to the other source, for example, from the left source to the right source. A right purge button 726 controls the manual purging of the right source valve and when pressed and held by the user purges the right source valve until the button is released.

Figure 8:
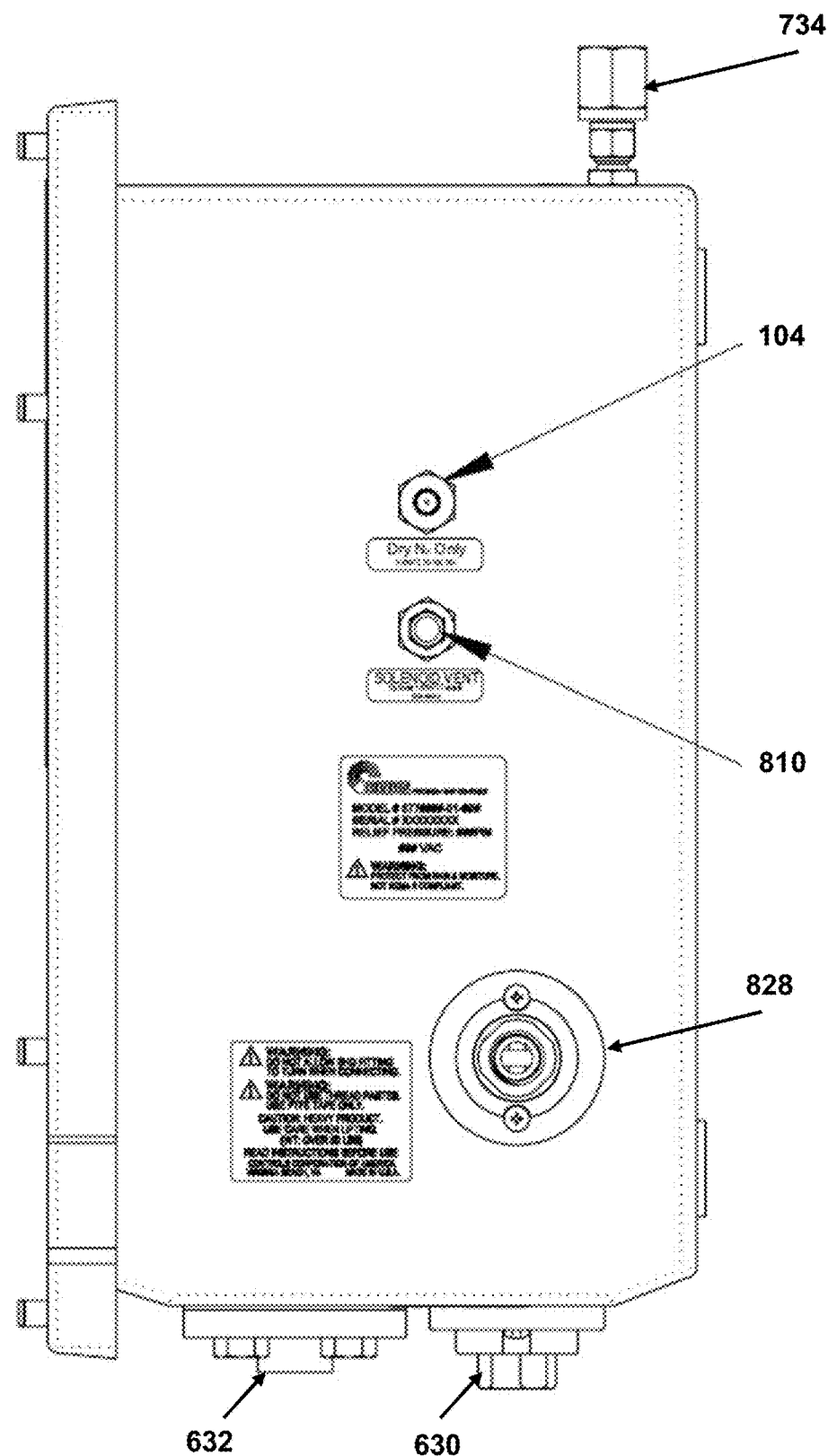
FIG. 8 is a right side view of an air actuated valve switch system, in accordance with an embodiment of the present invention.

FIG. 8 is a right side view of an air actuated valve switch system, in accordance with an embodiment of the present invention. In FIG. 8, the control gas input connection 104 is shown above a solenoid vent 810. A right cryogenic liquid input port 828 is located below and slightly to the rear of the solenoid vent 810 and the control gas input connection 104 for connecting with the cryogenic hose 531 from the second Nitrogen Dewar 552. The relief valve pipe vent connection 734 is located on a top of the air actuated valve switch system 510 for connection to the relief valve gas pipe 512 for the venting of pressures released from the internal relief valves to a remote location.

Figure 9:
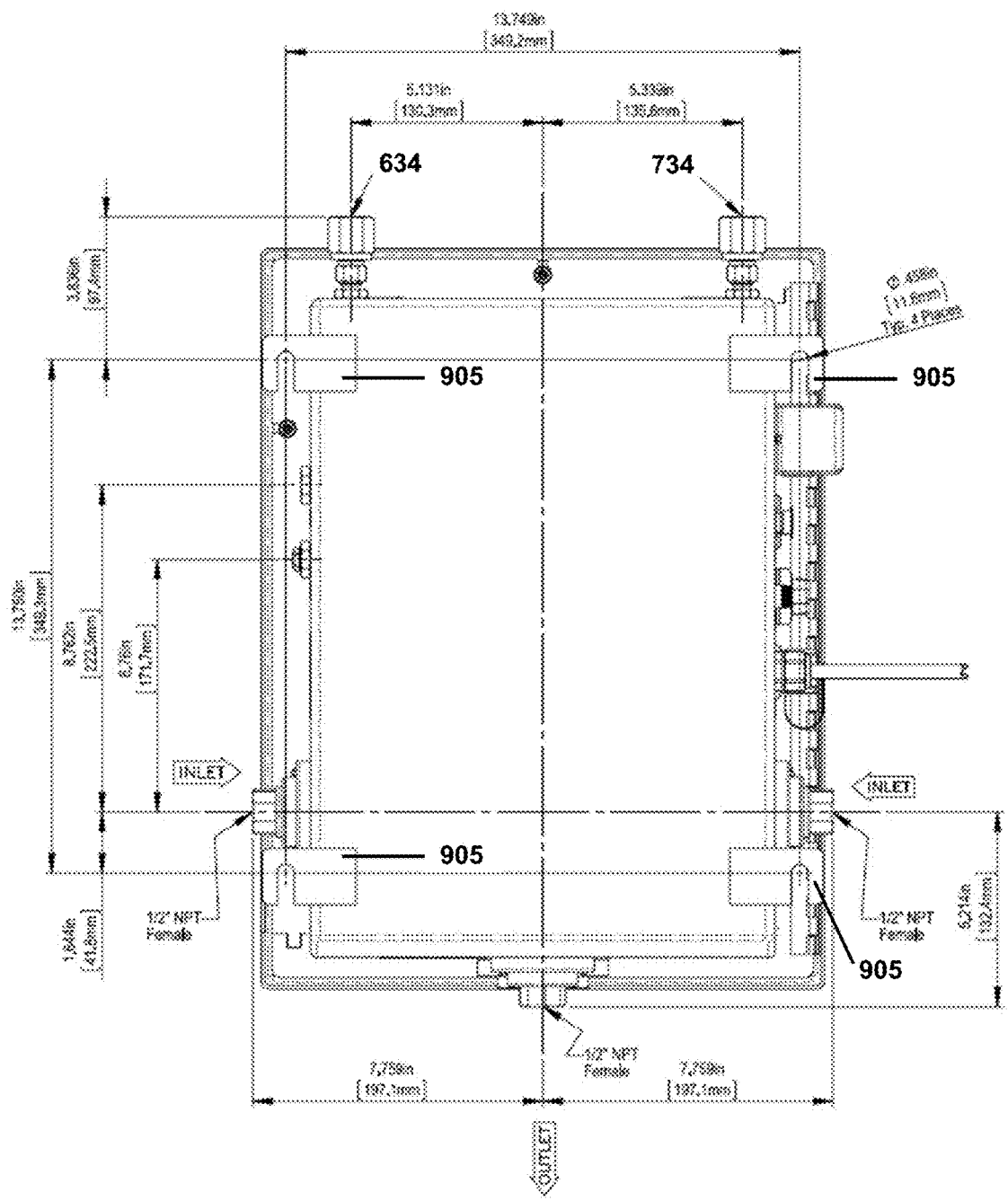
FIG. 9 is a back view of an air actuated valve switch system, in accordance with an embodiment of the present invention.

FIG. 9 is a back view of an air actuated valve switch system, in accordance with an embodiment of the present invention. In FIG. 9, the dimensions of the dimensions of the air actuated valve switch system 510 are shown as well as four mounting flanges 905, two on each side, with downwardly opening channels to permit a nail or screw head and shaft to slide into the channel and support the air actuated valve switch system 510.

Figure 10:
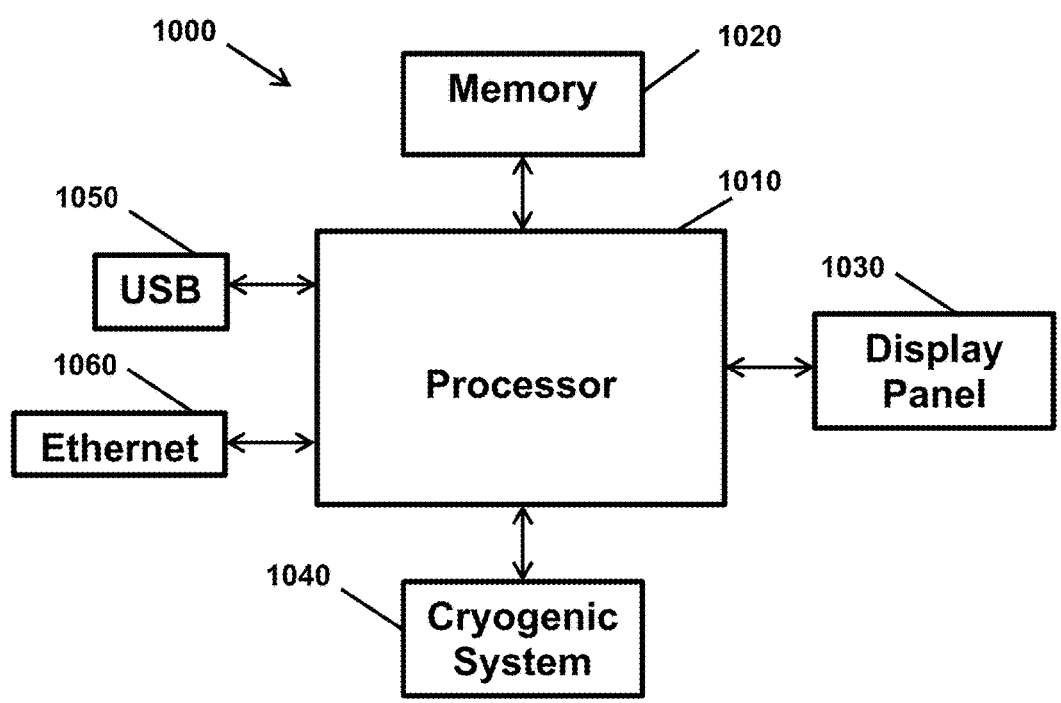
FIG. 10 is a block diagram of an exemplary control processor system, in accordance with an embodiment of the present invention.

FIG. 10 is a block diagram of an exemplary control processor system, in accordance with an embodiment of the present invention. In FIG. 10, a control processor system 1000 includes a processor 1010, a memory 1020 for storing executable instructions that is connected to and in two-way communication with the processor 1010, and a display panel 1030 for displaying system status information and entering control commands that is connected to and in two-way communication with the processor 1010. The processor 1010 is also connected to and in two-way communication with and to control the operation of a cryogenic system 1040, which includes the previously described components, as well as a USB port 1050 and an Ethernet connection 1060 to send and receive information and data. Although not explicitly shown in FIG. 10, the processor 1010 is also connected to and in two-way communication with the alarm output 513, the alarm 618, and an oxygen deficiency sensor input.

In the one or more embodiments of the present invention, there are several modes of operation, for example, an on demand mode (with pressure and temperature sensitivity), an on demand mode (with temperature sensitivity) and a keep full mode, all of which will now be described. In the on demand mode (with pressure and temperature sensitivity), the system maintains both source valves in a closed position. The unit monitors the outlet side of the system and senses when a device connected indicates a fill or demand for liquid to be delivered. Once an indication for a fill or liquid to be delivered is sensed, the purge valve for the primary supply side is opened and hot gas is purged through the vent connection. This continues until the system senses that liquid is at the source valve. The primary source valve will then open and delivers liquid to the outlet. Once the demand for fill or liquid is complete, the system turns off the primary source valve. The primary source valve will remain off until another demand or fill is sensed.

When in the on demand mode (with pressure and temperature sensitivity), during the fill or demand cycle, the presence of liquid is continually monitored at the side selected. If during demand from the selected side the system senses liquid is not present, the system will automatically attempt to purge the supply and shut the valve. If liquid is not quickly returned to the primary source valve, the system will switch to purging the reserve side. Once liquid is detected at the reserve source valve, reserve source valve opens to continue delivering liquid to the outlet until the demand or fill cycle is complete.

When in either of the on demand modes, on the display a green LED lamp, indicating the ON DEMAND mode, will illuminate. The side selected to be primary will have the green SELECTED light. The reserve side lamp will not be illuminated. If the system senses that there are sources connected to both sides the primary and reserve, the liquid lights will illuminate yellow.

Further, in the on demand mode (with pressure and temperature sensitivity), when a fill or demand for liquid is sensed, the green FILLING and the primary side PURGE light will illuminate. This is an indication that the system is purging hot gas from the primary inlet. Once liquid is detected at the primary source valve, the LIQUID light will turn green, indicating liquid is present and the primary source valve will open. For a short period of time, the purge valve will also remain open. It will then close and the purge light will extinguish. Once the system senses that the fill or demand for liquid has ceased, the FILLING light will extinguish, indicating the primary source valve has closed. The system will sense the absence of liquid at the primary inlet and turn the liquid light from green to yellow.

Still further, in the on demand mode (with pressure and temperature sensitivity), if during a fill sequence the system senses liquid is not present at the primary inlet, the LIQUID light will turn yellow and the purge light will be illuminate signifying the system is attempting to bring liquid back to the primary side. Once liquid is returned to the primary side, the liquid light will turn green again. If liquid is not returned to the primary side in a specific period of time, the LIQUID light will be extinguished and the red REPLACE light will illuminate. The reserve side green SELECTED light will be turned on signifying the system has switched to the reserve side. The reserve side purge light will illuminate until liquid is detected. At that point, the LIQUID light will turn green indicating the reserve source valve has opened and that liquid is being delivered from the reserve side.

In any of the three modes of operation, when the empty cylinders are removed from the depleted side, and full cylinders are connected with their valves opened, the RESET button must be pushed. The system will detect the new source and turn the liquid light yellow and extinguish the replace light.

When in the on demand mode (with temperature sensitivity), the system maintains the selected source valve in an open position. The unit monitors the temperature of the selected side looking for a continuous drop in temperature for a period longer than a configurable "defog time", indicating a fill has been requested. Once an indication for a fill or liquid to be delivered is sensed, the purge valve for the primary supply side is opened and hot gas is purged through the vent connection. This continues until the system senses that liquid is at the source valve.

In the on demand mode (with temperature sensitivity), during the fill or demand cycle, the presence of liquid is continually monitored at the side selected. If during a fill from the selected side the system senses liquid is not present, the system will automatically attempt to purge the supply. If the presser in the Dewar on the selected side drops below a preconfigured switchover pressure, the system will switch to purging the reserve side.

Further, in the on demand mode (with temperature sensitivity), on the display a green LED lamp, indicating the ON DEMAND mode, will illuminate. The side selected to be primary will have the green SELECTED light. The reserve side lamp will not be illuminated. If the system senses that there are sources connected to both sides the primary and reserve, the liquid lights will illuminate yellow.

Further still, in the on demand mode (with temperature sensitivity), when a fill or demand for liquid is sensed, the green FILLING and the primary side PURGE light will illuminate. This is an indication that the system is purging hot gas from the primary inlet. Once liquid is detected at the primary source valve, the LIQUID light will turn green, indicating liquid. For a short period of time, the purge valve will also remain open. It will then close and the purge light will extinguish. Once the system senses that the fill or demand for liquid has ceased, the FILLING light will extinguish, indicating the primary source valve has closed. The system will sense the absence of liquid at the primary inlet and turn the liquid light from green to yellow.

Still further, in the on demand mode (with temperature sensitivity), if during a fill sequence the system senses liquid is not present at the primary inlet, the LIQUID light will turn yellow and the purge light will be illuminate signifying the system is attempting to bring liquid back to the primary side. Once liquid is returned to the primary side, the liquid light will turn green again. If liquid is not returned to the primary side in a specific period of time, the LIQUID light will be extinguished and the red REPLACE light will illuminate. The reserve side green SELECTED light will be turned on signifying the system has switched to the reserve side. The reserve side purge light will illuminate until liquid is detected. At that point, the LIQUID light will turn green indicating the reserve source valve has opened and that liquid is being delivered from the reserve side.

Yet further still, in the on demand mode (with temperature sensitivity), when the empty cylinders are removed from the depleted side, and full cylinders are connected with their valves opened, the RESET button must be pushed. The system will detect the new source and turn the liquid light yellow and extinguish the replace light.

In the keep full mode, the system maintains the primary source valve in an open condition and the reserve source valve in a closed position. When selected for keep full mode, the system will purge the primary and reserve inlets to maintain liquid at both source valves. This ensures that liquid is instantaneously available from either side should there be a DEMAND or Fill required. When the system senses liquid is no longer present, at the primary inlet, the system will automatically switch supply to the reserve and continue delivering liquid to the outlet. In a high demand or continual use application, the amount of liquid nitrogen consumed doing purging will be minimal relative to that used to supply the demand. Keep full mode is not recommended for installations where demand is sporadic, as purging may lead to excessive product loss.

When in the keep full mode, on the display a green light for KEEP FULL and the green light for FILLING will illuminate. The side selected as the primary will have the green SELECTED light illuminated. The reserve side SELECTED light will remain off. If the system senses sources connected to both sides, the primary and reserve LIQUID lights will be illuminate yellow. The LIQUID light will not illuminate green until the system has purged one or both sides and determined that there is liquid present. For short periods of time, the purge LEDs will illuminate indicating the purge valves opening to maintain continuous liquid supply. The LIQUID lights will also switch from green to yellow as the system senses actual liquid presence at the inlets.

Further, when in the keep full mode, when liquid is not present or sensed at the primary inlet, the LIQUID light and the PURGE light will illuminate yellow signifying the system is attempting to bring liquid back to the primary side. Once liquid is returned to the primary side, the lamp will illuminate green again. If liquid is not returned to the primary side within a specified period of time, the LIQUID light will extinguish and the red REPLACE light will illuminate. The system will now switch to the reserve side and the green SELECTED light will illuminate. The reserve side purge light will remain on until liquid is detected. At that point, the LIQUID light will turn green signifying the reserve source valve has opened and that liquid is being delivered from the reserve side.

In an embodiment of the present invention, an apparatus includes an electronic control mechanism; a solenoid valve communicatively connected to the electronic control mechanism via an interface cable; a gas input control connected to the solenoid valve; a pair of pneumatic valve actuators connected to the gas input control via separate isolation tubing components; a pair of valve actuator pins, one each connected to a respective one of the pair of pneumatic valve actuators; a pair of pneumatic valves, one each connected to a respective one of the pair of valve actuator pins; a cryogenic liquid input in fluid communication with at least a portion of each of the pair of pneumatic valves; a first cryogenic liquid output in fluid communication with a first of the pair of pneumatic valves; a second cryogenic liquid output in fluid communication with a second of the pair of pneumatic valves; and a temperature probe positioned adjacent to an exit of the cryogenic liquid input to measure the temperature of an incoming cryogenic liquid and send a signal to the electronic control mechanism to open and close the pneumatic valves based at least in part on the temperature of the incoming cryogenic liquid.

In another embodiment of the present invention, a system includes an air actuated valve switch system connected to and in fluid communication with a dry control gas supply line, a plurality of control gas purge lines, a plurality of cryogenic hoses, a water drain and a cryogenic liquid purge valve, the air actuated valve switch system including a plurality of cryogenic liquid connections with each attached to one of the plurality of cryogenic hoses and each cryogenic liquid connection being connected to and in fluid communication with a cryogenic liquid inlet, which is connected to and in fluid communication with upper inlet chambers above a cryogenic liquid fill valve and a cryogenic liquid purge valve, lower inlet chambers located below the cryogenic liquid fill valve and the cryogenic liquid purge valve, which are connected to and in fluid communication with a cryogenic liquid output and a purge liquid output, respectively, a plurality of pneumatic bellows configured to actuate the cryogenic liquid fill valve and the cryogenic liquid purge valve; a plurality of liquid nitrogen cylinders each connected to and in fluid communication with one of the plurality of cryogenic hoses; and at least one cryogenic freezer connected to and in fluid communication with the air actuated valve switch system via a freezer connection cryogenic hose connected to the cryogenic liquid output.

In yet another embodiment of the present invention, a system includes an air actuated valve switch system connected to and in fluid communication with a dry control gas supply line, a plurality of cryogenic hoses, a water drain and a plurality of purge valves; a plurality of liquid nitrogen cylinders each connected to and in fluid communication with one of the plurality of cryogenic hoses; and at least one cryogenic freezer connected to and in fluid communication with the air actuated valve switch system via a freezer connection cryogenic hose.

In yet another embodiment of the present invention, a computer-implemented method, at least a portion of the method being performed by at least one processor, the at least one processor executing instructions from a memory storing the instructions to perform the method including receiving inlet temperatures and inlet and outlet pressures; determining whether a filling operation is in progress or an outlet pressure is <a fill pressure; if the filling operation is not in progress or the outlet pressure is not less than the fill pressure, then loop back to receiving inlet temperatures and inlet and outlet pressures, or if the filling operation is in progress or the outlet pressure is less than the fill pressure, then continue; setting a fill in progress variable to TRUE; determining whether the inlet temperature is >a cryogenic temperature in a container; if the inlet temperature is not >the cryogenic temperature in the container, then close a purge valve, open a source valve and loop back to receiving inlet temperatures and inlet and outlet pressures, or if the inlet temperature is >the cryogenic temperature in the container, then open the purge valve and continue; and determining whether the inlet temperature is >the cryogenic temperature in a container and the outlet pressure is >=the fill pressure; if the inlet temperature is >the cryogenic temperature in the container and the outlet pressure is >=the fill pressure, then close the purge valve, close the source valve, set the fill in progress variable to FALSE and loop back to receiving inlet temperatures and inlet and outlet pressures, or if the inlet temperature is not >the cryogenic temperature in the container and the outlet pressure is not >=the fill pressure, then loop back to receiving inlet temperatures and inlet and outlet pressures.

In yet another embodiment of the present invention, a computer-implemented method, at least a portion of the method being performed by at least one processor, the at least one processor executing instructions from a memory storing the instructions to perform the method including receiving inlet temperatures and inlet and outlet pressures; keeping a selected source valve open; determining whether a filling operation is in progress by determining whether the inlet temperature has continuously decreased for a period longer than a predefined defog time. If the filling operation is not in progress then loop back to receiving inlet temperatures and inlet and outlet pressures, or if the filling operation is in progress, then continue. The method further includes determining whether the inlet temperature is >a cryogenic temperature in a container; and if the inlet temperature is not >the cryogenic temperature in the container, then close a purge valve, and loop back to receiving inlet temperatures and inlet and outlet pressures, or if the inlet temperature is >the cryogenic temperature in the container, then open the purge valve and then loop back to receiving inlet temperatures and inlet and outlet pressures.

In still another embodiment of the present invention, a computer-implemented, at least a portion of the method being performed by at least one processor, the at least one processor executing instructions from a memory storing the instructions to perform the method including receiving inlet temperatures and inlet and outlet pressures; keeping a selected source valve open; determining whether the inlet temperature is >a cryogenic temperature in a container; and if the inlet temperature is not >the cryogenic temperature in the container, then close a purge valve, and loop back to receiving inlet temperatures and inlet and outlet pressures, or if the inlet temperature is >the cryogenic temperature in the container, then open the purge valve and then loop back to receiving inlet temperatures and inlet and outlet pressures.

While the invention(s) has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the invention(s) described herein.

What is claimed is:
1. A system comprising:
an air actuated valve switch system connected to and in fluid communication with each of a dry control gas supply line, a plurality of control gas purge lines, a plurality of cryogenic input hoses, a water drain and an outlet cryogenic hose, the air actuated valve switch system including a plurality of cryogenic liquid connections with each attached to a first end of one of the plurality of cryogenic input hoses and each of the plurality of cryogenic liquid connections being connected to and in fluid communication with a cryogenic liquid inlet of a valve actuator component, the cryogenic liquid inlet is connected to and in fluid communication with a plurality of upper inlet chambers located above and connected to and in fluid communication with a cryogenic liquid fill valve and a cryogenic liquid purge valve in the valve actuator component, a plurality of lower inlet chambers with one each of the plurality of lower inlet chambers located below the cryogenic liquid fill valve and the cryogenic liquid purge valve in the valve actuator component, respectively, and each of the plurality of lower inlet chambers connected to and in fluid communication with one of a cryogenic liquid output and a purge liquid output, respectively, a plurality of pneumatic bellows configured to actuate the cryogenic liquid fill valve and the cryogenic liquid purge valve;
a plurality of liquid nitrogen cylinders with each of the plurality of liquid nitrogen cylinders connected to and in fluid communication with a second end of one of the plurality of cryogenic input hoses; and
at least one cryogenic freezer connected to and in fluid communication with the air actuated valve switch system via the outlet cryogenic hose connected to the cryogenic liquid output.

2. The system of claim 1 wherein the air actuated valve switch system further comprises:
an electronic control mechanism;
a solenoid valve communicatively connected to the electronic control mechanism via an interface cable;
a gas input control connected to the solenoid valve;
a pair of pneumatic valve actuators connected to the gas input control via separate isolation tubing components;
a pair of valve actuator pins, one each connected to a respective one of the pair of pneumatic valve actuators;
a pair of pneumatic valves, one each connected to a respective one of the pair of valve actuator pins;
a cryogenic gas input in fluid communication with at least a portion of each of the pair of pneumatic valves;
a first cryogenic gas output in fluid communication with a first of the pair of pneumatic valves;
a second cryogenic gas output in fluid communication with a second of the pair of pneumatic valves; and
a temperature probe positioned adjacent to an exit of the cryogenic gas input to measure the temperature of an incoming cryogenic gas and send a signal to the electronic control mechanism to open and close the pair of pneumatic valves based at least in part on the temperature of the incoming cryogenic gas.

3. The system of claim 2 wherein the electronic control mechanism further comprises:
an audible alarm;
a USB connection; and
an Ethernet connection.

4. The system of claim 2 wherein the electronic control mechanism further comprises:
at least one processor and a memory storing instructions, the at least one processor executing the instructions to the perform the operations of:
receiving inlet temperatures and inlet and outlet pressures;
determining whether a filling operation is in progress or an outlet pressure is <a fill pressure;
if the filling operation is not in progress or the outlet pressure is not less than the fill pressure, then loop back to receiving inlet temperatures and inlet and outlet pressures, or
if the filling operation is in progress or the outlet pressure is less than the fill pressure, then continue;
setting a fill in progress variable to TRUE;
determining whether the inlet temperature is >a cryogenic temperature in a container;
if the inlet temperature is not >the cryogenic temperature in the container, then close a purge valve, open a source valve and loop back to receiving inlet temperatures and inlet and outlet pressures, or
if the inlet temperature is >the cryogenic temperature in the container, then open the purge valve and continue;
determining whether the inlet temperature is >the cryogenic temperature in the container and the outlet pressure is >=the fill pressure; and
if the inlet temperature is >the cryogenic temperature in the container and the outlet pressure is >=the fill pressure, then close the purge valve, close the source valve, set the fill in progress variable to FALSE and loop back to receiving inlet temperatures and inlet and outlet pressures, or
if the inlet temperature is not >the cryogenic temperature in the container and the outlet pressure is not >=the fill pressure, then loop back to receiving inlet temperatures and inlet and outlet pressures.

5. The system of claim 2 wherein the electronic control mechanism further comprises:
at least one processor and a memory storing instructions, the at least one processor executing the instructions to the perform the operations of:
receiving inlet temperatures and inlet and outlet pressures;
keeping a selected source valve open;
determining whether a filling operation is in progress;
if the filling operation is not in progress, then loop back to receiving inlet temperatures and inlet and outlet pressures, or
if the filling operation is in progress or the outlet pressure is less than the fill pressure, then continue;
determining whether the inlet temperature is >a cryogenic temperature in a container; and
if the inlet temperature is not >the cryogenic temperature in the container, then close a purge valve, and loop back to receiving inlet temperatures and inlet and outlet pressures, or
if the inlet temperature is >the cryogenic temperature in the container, then open the purge valve and then loop back to receiving inlet temperatures and inlet and outlet pressures.

6. The apparatus of claim 4 wherein determining whether a filling operation is in progress further comprises:
determining whether the inlet temperature has continuously decreased for a period longer than a predefined defog time.

7. The system of claim 2 wherein the electronic control mechanism further comprises:
at least one processor and a memory storing a plurality of executable instructions, the at least one processor executing the instructions to the perform the operations of:
receiving inlet temperatures and inlet and outlet pressures;
keeping a selected source valve open;
determining whether the inlet temperature is >a cryogenic temperature in a container; and
if the inlet temperature is not >the cryogenic temperature in the container, then close a purge valve, and loop back to receiving inlet temperatures and inlet and outlet pressures, or
if the inlet temperature is >the cryogenic temperature in the container, then open the purge valve and then loop back to receiving inlet temperatures and inlet and outlet pressures.

8. The system of claim 2 wherein each of the pair of pneumatic valve actuators comprises:
one of the pneumatic bellows that is operatively connected to one of the pair of valve actuator pins.

9. The system of claim 8 wherein each of the pair of pneumatic valve actuators further comprises:
a pneumatic valve actuator chamber surrounding the pneumatic bellows;
a pneumatic valve actuator inlet; and
a control gas input in fluid communication with the pneumatic valve actuator chamber through the pneumatic valve actuator inlet.

10. The system of claim 9 wherein in each of the pair of pneumatic valve actuators the pneumatic valve actuator chamber is not connected to nor is it in fluid communication with an upper inlet chamber surrounding a top portion of a pneumatic valve for controlling the flow of a cryogenic liquid.

11. The system of claim 2 wherein the electronic control mechanism further comprises:

controlling the actuation of each one of the pair of valve actuator pins and their respective one of the pair of pneumatic valves based on predetermined temperatures and pressures.

12. The system of claim 2 wherein each one of the pair of pneumatic valves comprises:
a valve seat;
a valve including
a valve pin;
a valve seal holder connected at a proximal end to the valve pin;
a valve seal fixedly connected to the valve seal holder and configured to contact and form a liquid-tight seal with the valve seat;
a pressure cap fixedly connected to the valve actuator component and an open end portion of the pressure cap surrounding au open end portion of the valve seal holder;
a biasing member located inside each of the pressure cap and the valve seal holder and biasing the valve seal holder and valve seal away from an inside bottom surface of a top flange portion of the pressure cap and against the valve seat.

13. A system comprising:
an air actuated valve switch system connected to and in fluid communication with each of a dry control gas supply line, a plurality of cryogenic hoses, a water drain and a plurality of purge valves;
a plurality of liquid nitrogen cylinders with each of the plurality of liquid nitrogen cylinders connected to and in fluid communication with the air actuated valve switch system via one of the plurality of cryogenic hoses;
at least one cryogenic freezer connected to and in fluid communication with the air actuated valve switch system via a freezer connection cryogenic hose;
at least one processor configured to perform a computer-implemented method, at least a portion of the method being performed by the at least one processor, the at least one processor executing instructions from a memory storing the instructions to perform the method comprising:
receiving inlet temperatures and inlet and outlet pressures;
determining whether a filling operation is in progress or an outlet pressure is <a fill pressure;
if the filling operation is not in progress or the outlet pressure is not less than the fill pressure, then loop back to receiving inlet temperatures and inlet and outlet pressures, or
if the filling operation is in progress or the outlet pressure is less than the fill pressure, then continue;
setting a fill in progress variable to TRUE;
determining whether the inlet temperature is >a cryogenic temperature in a container;
if the inlet temperature is not >the cryogenic temperature in the container, then close a purge valve, open a source valve and loop back to receiving inlet temperatures and inlet and outlet pressures, or
if the inlet temperature is >the cryogenic temperature in the container, then open the purge valve and continue;
determining whether the inlet temperature is >the cryogenic temperature in the container and the outlet pressure is >=the fill pressure; and
if the inlet temperature is >the cryogenic temperature in the container and the outlet pressure is >=the fill pressure, then close the purge valve, close the source valve, set the fill in progress variable to FALSE and loop back to receiving inlet temperatures and inlet and outlet pressures, or
if the inlet temperature is not >the cryogenic temperature in the container and the outlet pressure is not >=the fill pressure, then loop back to receiving inlet temperatures and inlet and outlet pressures.

* * * * *